(12) United States Patent
Takagi et al.

(10) Patent No.: US 7,001,714 B2
(45) Date of Patent: Feb. 21, 2006

(54) METHOD OF MANUFACTURING SUBSTRATE FOR LIQUID CRYSTAL DISPLAY DEVICE AND METHOD OF MANUFACTURING LIQUID CRYSTAL DISPLAY DEVICE USING SAME

(75) Inventors: Takashi Takagi, Kawasaki (JP); Manabu Sawasaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/830,513

(22) Filed: Apr. 23, 2004

(65) Prior Publication Data

US 2005/0123861 A1   Jun. 9, 2005

(30) Foreign Application Priority Data

Dec. 9, 2003   (JP)   .............................. 2003-410505

(51) Int. Cl.
*G02F 1/1333*   (2006.01)
(52) U.S. Cl. ...................................... 430/321; 430/330
(58) Field of Classification Search .................. 430/7, 430/321, 330; 349/113, 114
See application file for complete search history.

(56) References Cited

U.S. PATENT DOCUMENTS 6,452,653 B1 * 9/2002 Yamanaka et al. .......... 349/113
2002/0167622 A1 * 11/2002 Fuijbayashi .................. 349/43

FOREIGN PATENT DOCUMENTS

JP   2000-187208   7/2000

* cited by examiner

*Primary Examiner*—John A. McPherson
(74) *Attorney, Agent, or Firm*—Greer, Burns & Crain, Ltd.

(57) ABSTRACT

The present invention provides a method of manufacturing a substrate for MVA type or transreflective liquid crystal display device capable of obtaining a substrate for liquid crystal display device having a good display quality while simplifying the production process and a method of manufacturing a liquid crystal display device using same. A positive-working resist is spread over a glass substrate to form a resist layer thereon. The resist layer is exposed to light and developed to form a resist pattern having linear patterns. The linear pattern in the resist pattern is then irradiated with ultraviolet rays. The resist pattern is then subjected to heat treatment at a predetermined temperature to form a structure having a flat portion formed by the melt flow of the linear pattern irradiated with ultraviolet rays and a protrusion formed by the reflow of the linear pattern unirradiated with ultraviolet rays.

11 Claims, 24 Drawing Sheets

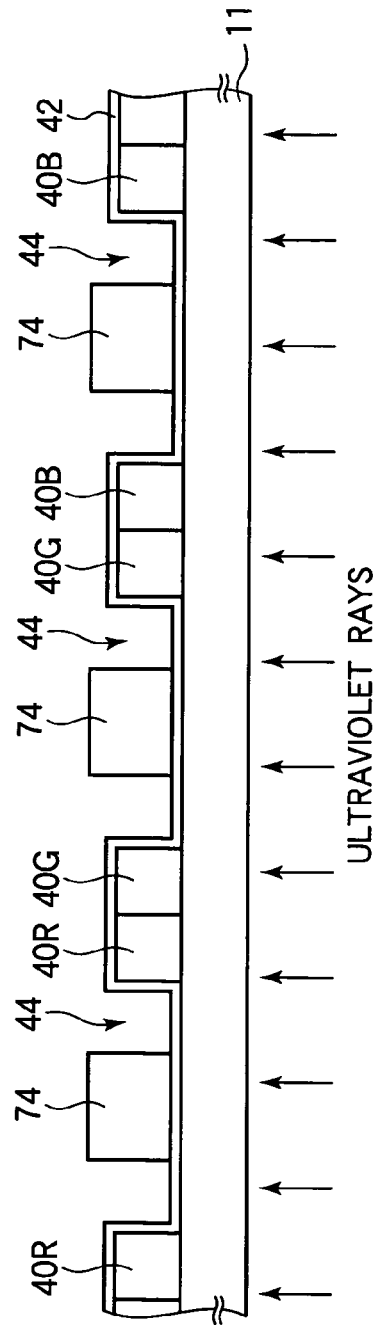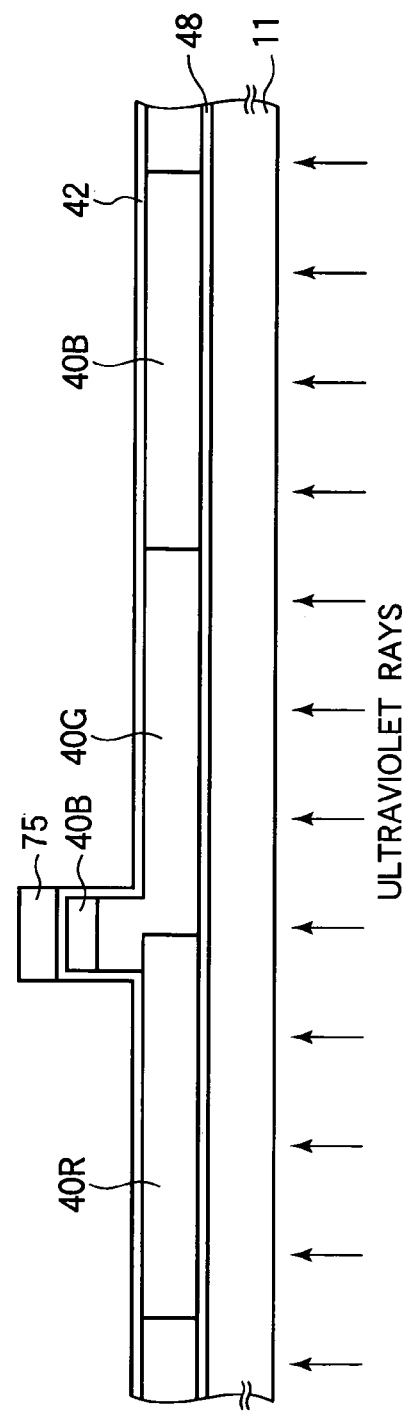

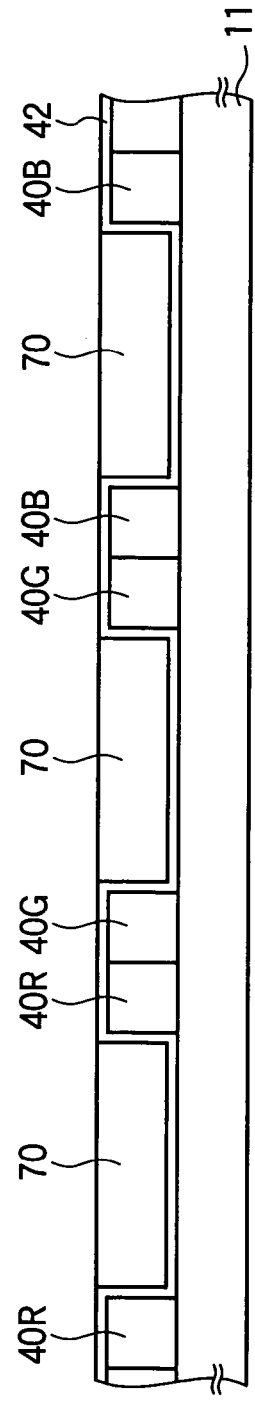
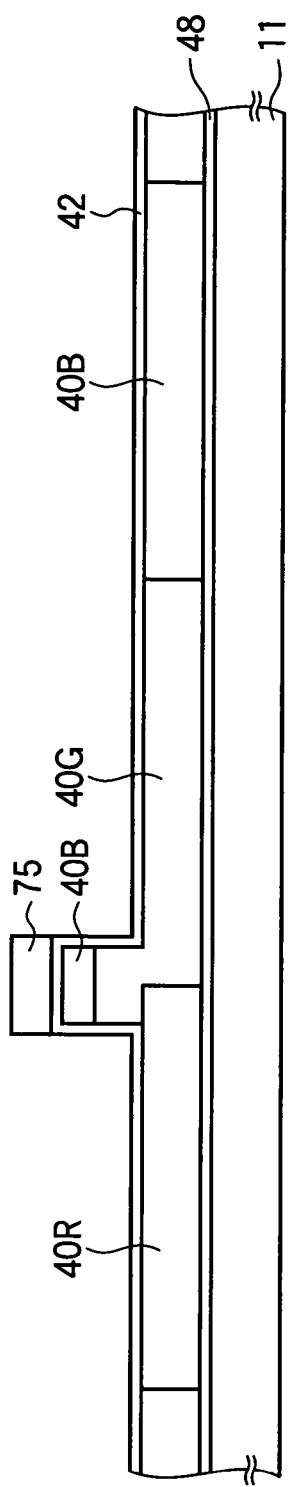
FIG.13A
FIG.13B

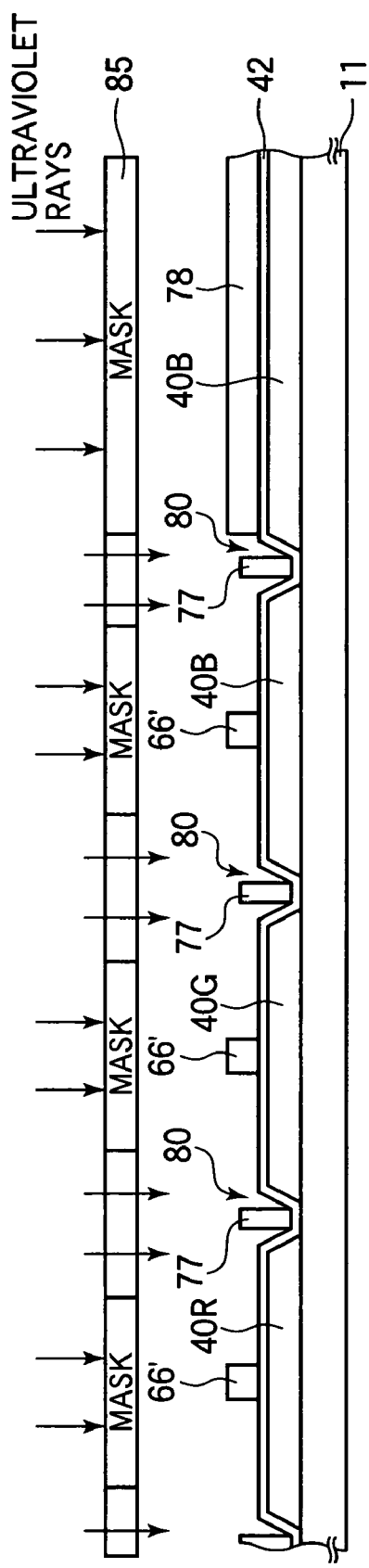

PRIOR ART
FIG.25
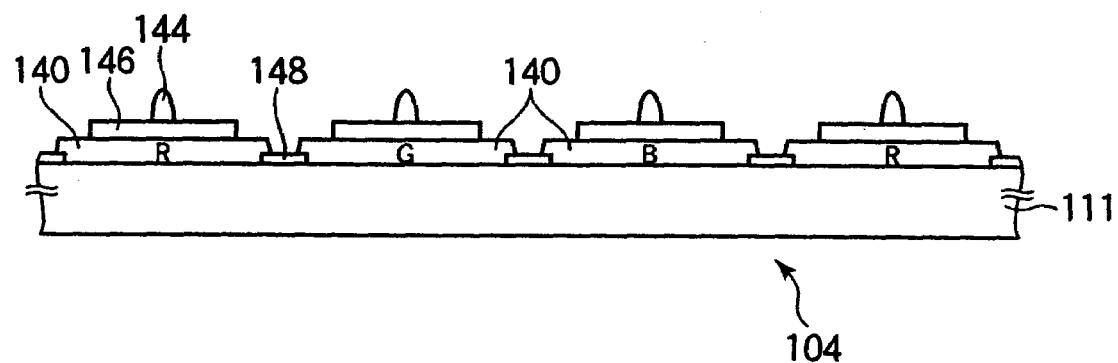
PRIOR ART
FIG.26A
PRIOR ART
FIG.26B
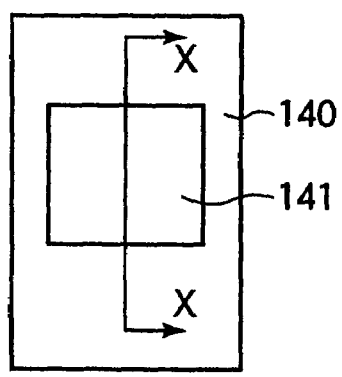
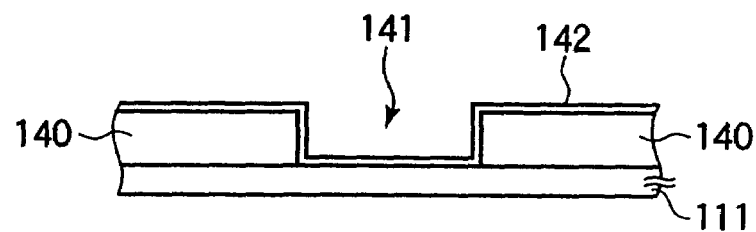

METHOD OF MANUFACTURING SUBSTRATE FOR LIQUID CRYSTAL DISPLAY DEVICE AND METHOD OF MANUFACTURING LIQUID CRYSTAL DISPLAY DEVICE USING SAME

BACKGROUND OF THE INVENTION

1. Field of the Invention

The present invention relates to a method of manufacturing a substrate for liquid crystal display device and a method of manufacturing a liquid crystal display device using same. More particularly, the present invention relates to a method of manufacturing a substrate for MVA type or transreflective liquid crystal display device and a method of manufacturing a liquid crystal display device using same.

2. Description of Related Art

As a liquid crystal display device having a high viewing angle there is used an MVA (Multi-domain Vertical Alignment) type liquid crystal display device. An MVA type liquid crystal display device comprises a vertically-aligned liquid crystal sealed interposed between a thin film transistor (TFT) substrate and an opposite substrate and an alignment controlling structure formed on at least one of the two substrates for controlling and dividing the alignment of the liquid crystal into a plurality of alignment regions within the pixel region. As such an alignment controlling structure there is used an alignment controlling protrusion formed by a dielectric material or the like. By controlling the alignment of the liquid crystal, an MVA type liquid crystal display device can be provided with a drastically enhanced viewing angle.

However, the conventional MVA type liquid crystal display device is disadvantageous in that it has different γ characteristics between in the direction perpendicular to the surface of the display (front direction) and in the direction oblique to the surface of the display. As a method for overcoming this difficulty there has been proposed a method which comprises providing a plurality of regions having different threshold voltages in a pixel to relax the change of γ characteristics in the oblique direction. In order to provide regions having different threshold voltages in a pixel, a dielectric layer capable of lowering the effective voltage applied to the liquid crystal layer is provided in a part of the pixel.

FIG. 25 illustrates the sectional configuration of the opposite substrate in a conventional MVA type liquid crystal display device comprising a dielectric layer provided therein. As shown in FIG. 25, an opposite substrate 104 comprises a light-shielding layer (BM) 148 formed on a glass substrate 111 for defining the pixel region, color filter (CF) layer 140 formed every pixel region and a common electrode (not shown) formed on the entire surface of the substrate of the CF layer 140. A dielectric layer 146 is formed on the common electrode and on a part of the pixel region. On the dielectric layer 146 is formed an alignment controlling protrusion 144 for dividing alignment. This arrangement is advantageous in that the resulting liquid crystal display device exhibits improved display properties but is disadvantageous in that a step of forming the dielectric layer 146 is required, adding to the number of steps in the method of manufacturing the liquid crystal display device.

As a display device for mobile type terminals or note type personal computers there is used a transreflective type (including slightly-light transmitting type and slightly reflective type) liquid crystal display device capable of displaying in both transmission and reflection modes. The pixel regions in the transreflective type liquid crystal display device each has a reflective region having a reflective electrode formed on TFT substrate side thereof and a transmission region having a transparent electrode formed on TFT substrate side thereof. FIG. 26A illustrates the configuration of the pixel region (reflective region) of the opposite substrate in a conventional transreflective liquid crystal display device. FIG. 26B illustrates the sectional configuration of the opposite substrate of FIG. 26A taken on line X—X. As shown in FIGS. 26A and 26B, a CF layer 140 having an opening 141 is formed on a part of the reflective region on the glass substrate 111 on the opposite substrate side thereof. A common electrode 142 is formed on the entire surface of the substrate on the CF layer 140. In this arrangement, the liquid crystal display device is adapted to mix light transmitted by the CF layer 140 with light passing through the opening 141, making it possible to inhibit the drop of reflectance during display in reflection mode. Further, the formation of a dielectric layer 147 having the same thickness as that of the CF layer 140 makes it possible to approximate γ characteristics of the two modes, i.e., transmission mode and reflection mode by each other and hence realize a liquid crystal display device having a reduced difference in display properties between the two modes. The dielectric layer 147 is formed by a photolithographic process with a transparent resist.

However, a positioning error in the patterning of the dielectric layer 147 makes it likely that a misalignment in overlapping can occur between the dielectric layer 147 and the opening 141 of the CF layer 140. FIG. 27A illustrates the configuration of the pixel region of the opposite substrate having an alignment error in overlapping. FIG. 27B illustrates the sectional configuration of the opposite substrate of FIG. 27A taken on line Y—Y. As shown in FIGS. 27A and 27B, the misalignment in overlapping between the dielectric layer 147 and the opening 141 makes it impossible to fill the entire part of the opening 141 with the dielectric layer 147, leaving an opening 141' behind.

FIG. 28 illustrates the sectional configuration of a liquid crystal display device comprising an opposite substrate having the opening 141' left behind. As shown in FIG. 28, the reflective region comprising a reflective electrode 117 formed on a glass substrate 110 on TFT substrate side thereof is subject to light leak or disturbance of alignment of liquid crystal due to the difference in cell thickness caused by the presence of the opening 141'. As a result, the liquid crystal display device exhibits a deteriorated display quality in reflection mode.

[Patent Document]
  JP-A-2000-187208

SUMMARY OF THE INVENTION

It is therefore an object of the invention to provide a method of manufacturing a substrate for liquid crystal display device capable of providing a good display quality while simplifying the production process and a method of manufacturing a liquid crystal display device using same.

The above and other objects of the invention are accomplished by a method of manufacturing a substrate for liquid crystal display device, comprising the steps of forming a resist layer by spreading a positive-working resist on a base substrate, forming a resist pattern having a predetermined shape by exposing and developing the resist layer, irradiating a part of the resist pattern with ultraviolet rays, and forming a structure by heat treatment to the resist pattern at a predetermined temperature so that the resist pattern which has been irradiated with ultraviolet rays undergoes melt flow.

In accordance with the invention, a liquid crystal display device capable of providing a good display quality while simplifying the production process can be realized.

BRIEF DESCRIPTION OF THE DRAWINGS

By way of example and to make the description more clear, reference is made to the accompanying drawings in which:

FIGS. 12A and 12B are sectional views illustrating a method of manufacturing a substrate for liquid crystal display device according to the third embodiment of implementation of the invention;

FIGS. 13A and 13B are sectional views illustrating a method of manufacturing a substrate for liquid crystal display device according to the third embodiment of implementation of the invention;

FIG. 24 is a sectional view illustrating a modification of the method of manufacturing a substrate for liquid crystal display device according to the fifth embodiment of implementation of the invention;

FIG. 25 is a sectional view illustrating the configuration of an opposite substrate for conventional MVA type liquid crystal display device;

FIGS. 26A and 26B are diagrams illustrating the configuration of an opposite substrate for conventional transreflective liquid crystal display device;

DESCRIPTION OF THE PREFERRED EMBODIMENTS

[First Embodiment of Implementation of the Invention]

Figure 1A:
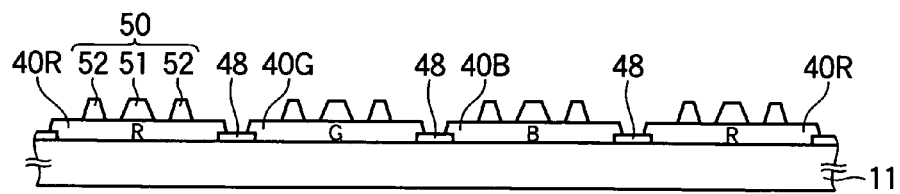
FIGS. 1A, 1B and 1C are sectional views illustrating a method of manufacturing a substrate for liquid crystal display device according to the first embodiment of implementation of the invention.
Figure 1B:
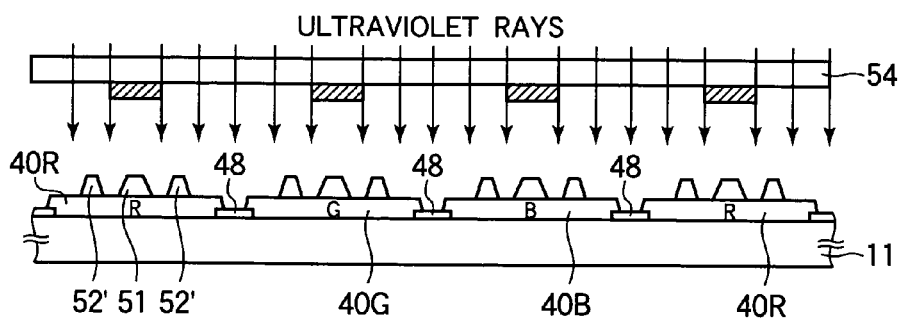
Figure 1C:
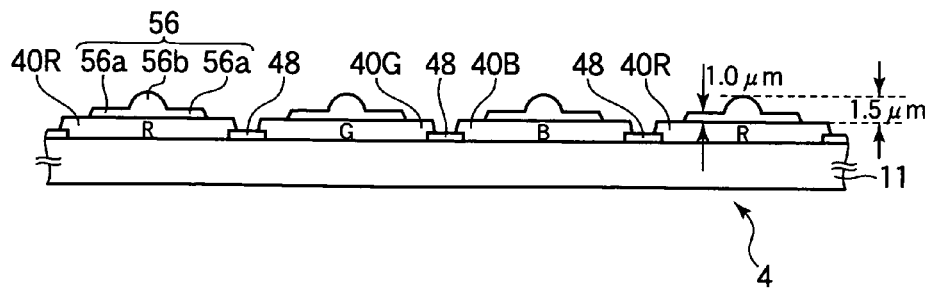
Figure 2:
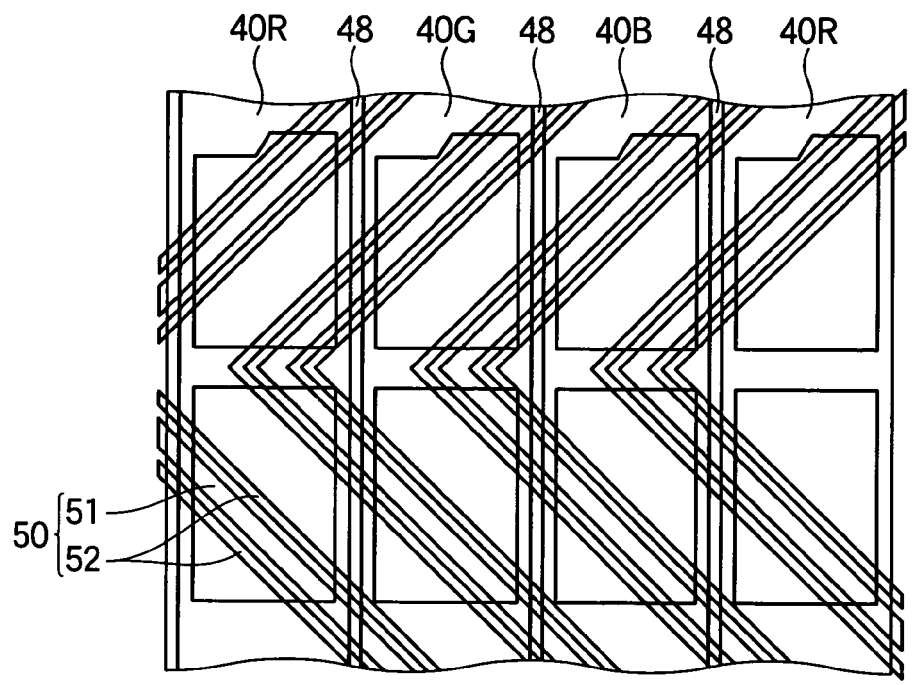
FIG. 2 is a diagram illustrating a method of manufacturing a substrate for liquid crystal display device according to the first embodiment of implementation of the invention.
Figure 3:
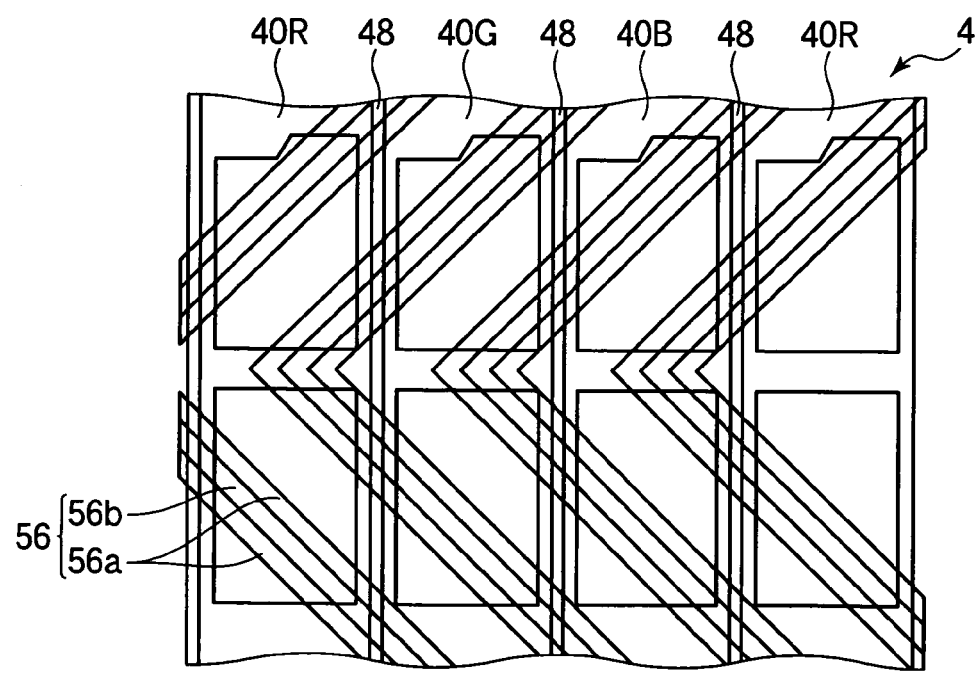
FIG. 3 is a diagram illustrating a method of manufacturing a substrate for liquid crystal display device according to the first embodiment of implementation of the invention.

A method of manufacturing a substrate for liquid crystal display device according to a first embodiment of implementation of the invention and a method of manufacturing a liquid crystal display device using same will be described hereinafter in connection with FIGS. 1 to 5. FIGS. 1A to 1C each are a sectional view illustrating the method of manufacturing an opposite substrate according to the present embodiment of implementation of the invention. FIG. 2 is a view of the opposite substrate of FIG. 1A as viewed perpendicularly to the plane of the substrates. FIG. 3 is a view of the opposite substrate of FIG. 1C as viewed perpendicularly to the plane of the substrate. As shown in FIG. 1A and FIG. 2, BM48 is formed on a glass substrate (a base substrate) 11 by a metal such as chromium (Cr) or a resin. BM48 is adapted to define the pixel region and shield a storage capacitor portion formed on the substantially central part of the pixel region from light. Subsequently, CF layers 40R, 40G and 40B are sequentially formed by red (R), green (G) and blue (B) color resists, respectively. Subsequently, a common electrode (not shown) made of ITO is formed on the entire surface of the substrate of CF layers 40R, 40G and 40B. Subsequently, a positive-working novolak-based resist is spread over the entire surface of the common electrode to a thickness of 1.5 µm. A resist pattern 50 is then formed by a photolithographic process. The resist pattern 50 comprises a first linear pattern 51 extending obliquely to the end of the pixel region and a second linear pattern 52 consisting of two lines disposed on the respective side of the linear pattern 51 with a predetermined gap therebetween extending in parallel to the linear pattern 51.

Subsequently, the pattern is irradiated with, e.g., ultraviolet rays having a radiation energy of 500 mJ through a photomask 54 having a pattern drawn therein for light-shielding the forming region of the linear pattern 51 as shown in FIG. 1B so that the unexposed linear pattern 52 is exposed to light to form a linear pattern 52'. Subsequently, the product is subjected to heat treatment (postcure) in an oven having a temperature of from 150° C. to 250° C. (e.g., 220° C.) for 1 hour. As shown in FIG. 1C and FIG. 3, this heat treatment causes the linear pattern 52' which has been irradiated with ultraviolet rays to undergo melt flow and the unexposed linear pattern 51 to reflow. As a result, a structure 56 having a predetermined shape is formed. When a resist having a small average molecular weight is used, the resulting resist pattern 50 exhibits a low heat resistance and thus can undergo melt flow regardless of whether or not it is irradiated with ultraviolet rays. Therefore, in order to effect heat treatment such that the linear pattern 52' which has been irradiated with ultraviolet rays undergoes melt flow while the linear pattern 51 which has not been irradiated with ultraviolet rays is allowed to reflow, it is preferred that a resist having a large average molecular weight (e.g., 10,000 or more) be used. Further, when the wavelength of the ultraviolet rays with which the linear pattern 52 is irradiated is less than 300 nm, crosslinking reaction causes the linear pattern 52' to harden to an extent such that it cannot undergo melt flow even when heated. Accordingly, the wavelength of the ultraviolet rays with which the linear pattern 52 is irradiated is preferably 300 nm or more (450 nm or less).

The structure 56 comprises a substantially flat portion 56a formed by the melt flow of the linear pattern 52' and a protrusion portion 56b higher than the flat portion 56a formed by the reflow of the linear pattern 51. The height of the flat portion 56a and the protrusion portion 56b are about 1.0 µm and about 1.5 µm, respectively. When the aforementioned steps are completed, an opposite substrate 4 is formed. Thereafter, a TFT substrate 2 having TFT, a pixel electrode 16, etc. formed on a glass substrate 10 and the opposite substrate 4 are laminated on each other with a liquid crystal 6 sealed interposed between the substrates 2 and 4 to complete a liquid crystal display device (see FIG. 4).

Figure 4:
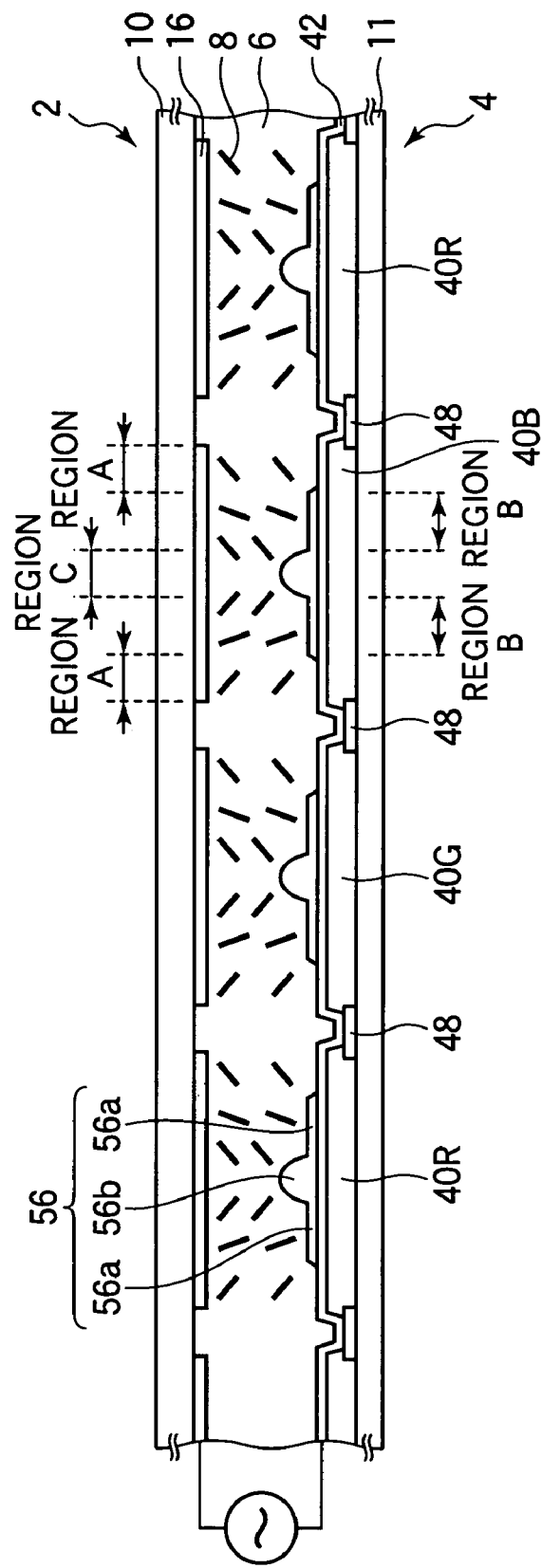
FIG. 4 is a sectional view illustrating the configuration of a liquid crystal display device prepared by a method of manufacturing a liquid crystal display device according to the first embodiment of implementation of the invention.
Figure 5:
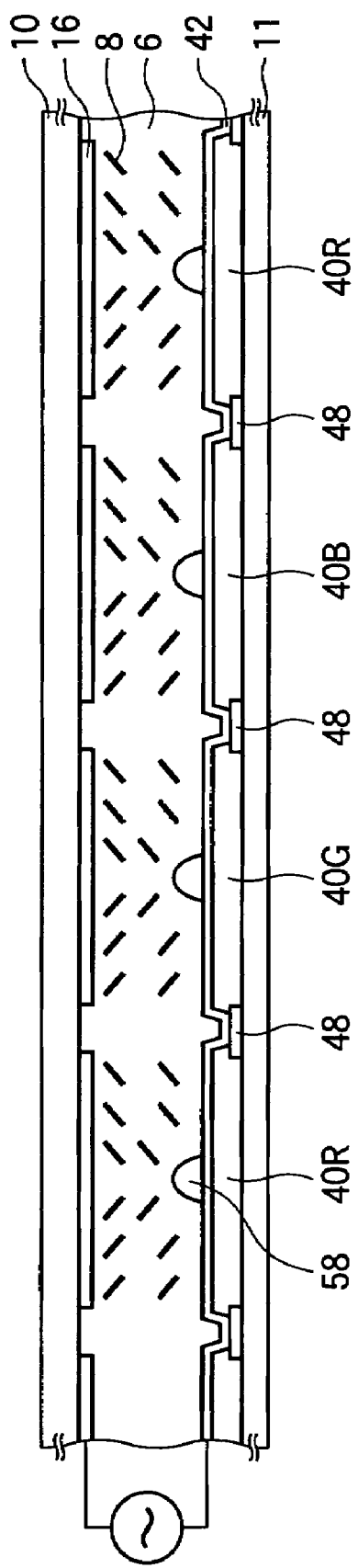
FIG. 5 is a sectional view illustrating the configuration of a liquid crystal display device having a linear protrusion 58 rather than structure 56.

FIG. 4 illustrates a sectional configuration of a liquid crystal display device prepared by the method of manufacturing a liquid crystal display device according to the present embodiment of implementation of the invention. FIG. 5 illustrates a sectional configuration of a liquid crystal display device having a conventional linear protrusion 58 rather than structure 56. FIGS. 4 and 5 each illustrate how the liquid crystal 6 behaves when a predetermined voltage is applied thereto. As shown in FIG. 4, each pixel region comprises a region A having no structure 56 formed on the common electrode 42, a region B having the flat portion 56a formed thereon and a region C having the protrusion portion 56b formed thereon. The protrusion portion 56b is capable of controlling the alignment of the liquid crystal 6 and the flat portion 56a acts as a dielectric material that lowers the effective voltage applied to the liquid crystal 6.

When no voltage is applied to the liquid crystal 6, the liquid crystal molecules 8 in the region A and the region B are aligned almost perpendicularly the surface of the substrate. The liquid crystal molecules 8 in the region C are aligned almost perpendicularly to the surface of the protrusion portion 56b and thus is aligned obliquely to the surface of the substrate.

When a voltage is applied to the liquid crystal 6, the angle of inclination of the liquid crystal molecules 8 from the direction perpendicular to the surface of the substrate is relatively great in the region A because the effective voltage applied to the liquid crystal 6 is highest in the region A, where no structure 56 is formed, as shown in FIG. 4. In the region B, the effective voltage applied to the liquid crystal 6 is lower than that in the region A. Thus, the angle of inclination of the liquid crystal molecules 8 from the direction perpendicular to the surface of the substrate in the region B is smaller than that in the region A.

In the liquid crystal display device shown in FIG. 5, liquid crystal molecules are aligned in two directions (two kinds) with respect to one linear protrusion 58. On the other, the liquid crystal display device shown in FIG. 4 further comprises the flat portion 56a formed therein for lowering the effective voltage applied to the liquid crystal 6 and thus has two or more regions having different threshold voltages formed per alignment direction. Therefore, liquid crystal molecules are aligned in four or more directions with respect to one structure 56. In this arrangement, the difference between chromaticity in the front direction and chromaticity in the oblique direction is reduced, relaxing the difference in tint between display in the front direction and display in the oblique direction. Accordingly, the liquid crystal display device shown in FIG. 4 can have good display properties. In accordance with the method of manufacturing a liquid crystal display device according to the present embodiment of implementation of the invention, the addition of a step of selectively irradiating the linear pattern 52 with ultraviolet rays makes it possible to form the protrusion portion 56b which can act as an alignment controlling protrusion and the flat portion 56a having a height different from the protrusion portion 56b which acts as a dielectric material for weakening electric field at one photolithographic step. Accordingly, the present embodiment of implementation of the invention makes it possible to obtain a liquid crystal display device having good display properties while simplifying the production process.

[Second Embodiment of Implementation of the Invention]

Figure 6A:
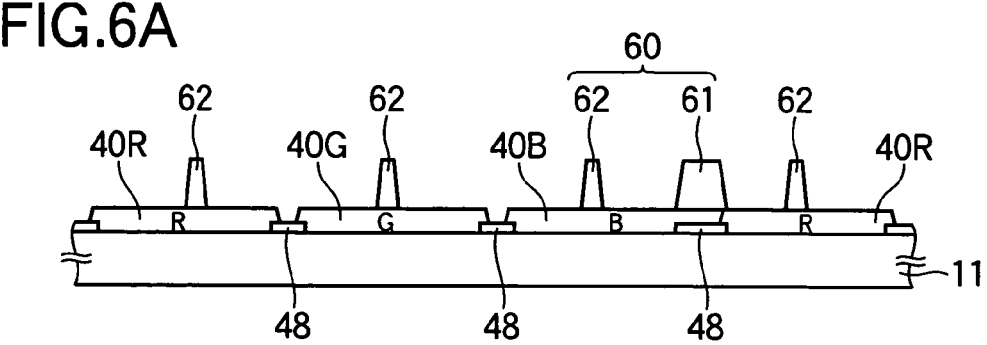
FIGS. 6A, 6B and 6C are sectional views illustrating a method of manufacturing a substrate for liquid crystal display device according to the second embodiment of implementation of the invention.

A method of manufacturing a substrate for liquid crystal display device according to the second embodiment of implementation of the invention and a method of manufacturing a liquid crystal display device using same will be described in connection with FIGS. 6 and 7. FIGS. 6A to 6C each are a sectional view illustrating the method of manufacturing an opposite substrate according to the present embodiment of implementation of the invention. FIG. 7 is a view of the opposite substrate of FIG. 6C as viewed perpendicularly to the surface of the substrate. BM48 and CF layers 40R, 40G and 40B are formed on a glass substrate 11 as shown in FIG. 6A. The regions at which a pillar spacer is formed in the subsequent step are formed adjacent to each other in such an arrangement that no gap is formed between the adjacent CF layers 40R, 40G and 40B. Subsequently, a common electrode (not shown) made of ITO is formed on the entire surface of the substrate on CF layers 40R, 40G and 40B. Subsequently, a positive-working novolak-based resist (average molecular weight: 10,000 or more) is spread over the entire surface of the common electrode to a thickness of 3.0 $\mu$m. A resist pattern 60 is then formed on the resist by a photolithographic process. The resist pattern 60 comprises a dotted pattern 61 formed on the region of pillar spacer and a linear pattern 62 having a width of 9 $\mu$m extending obliquely to the end of the pixel region similarly to the linear pattern 51 shown in FIG. 2.

Figure 6B:
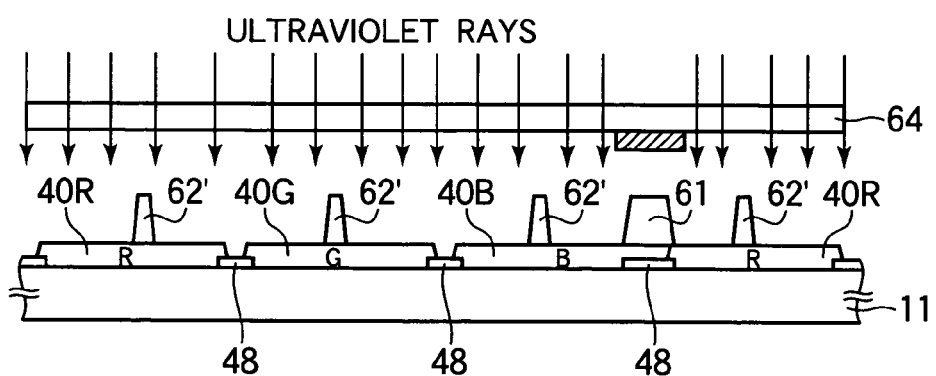
Figure 6C:
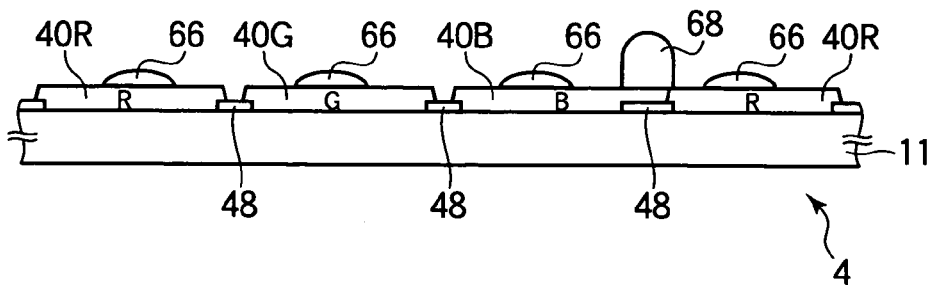
Figure 7:
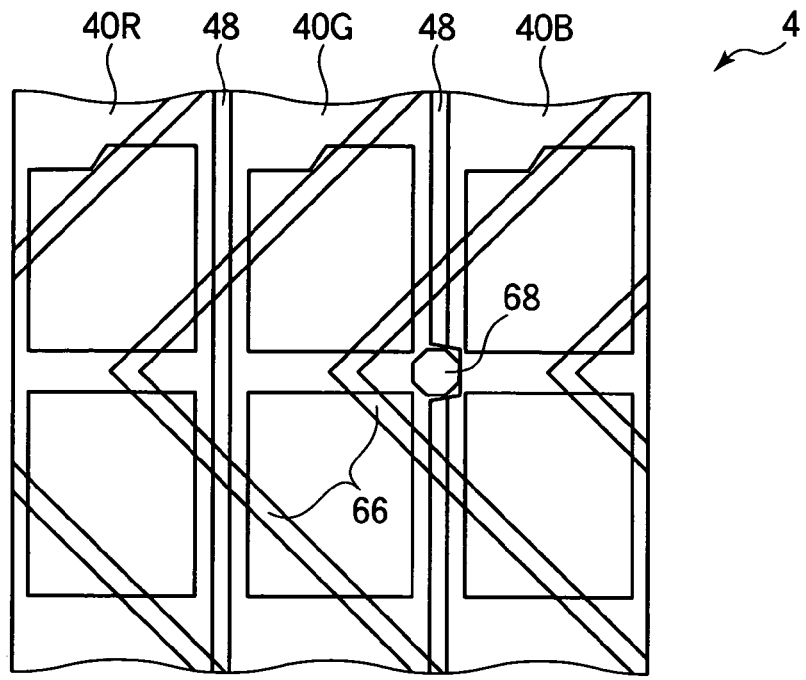
FIG. 7 is a diagram illustrating a method of manufacturing a substrate for liquid crystal display device according to the second embodiment of implementation of the invention.

Subsequently, the pattern is irradiated with ultraviolet rays having a radiation energy of 200 mJ (wavelength: 300 nm to 450 nm) through a photomask 64 having a pattern drawn therein for light-shielding the region of the dotted pattern 61 as shown in FIG. 6B so that the unexposed linear pattern 62 is exposed to light to form a linear pattern 62'. Subsequently, the product is subjected to heat treatment (postcure) in an oven having a temperature of from 150° C. to 250° C. (e.g., 220° C.) for 1 hour. As shown in FIG. 6C and FIG. 7, this heat treatment causes the linear pattern 62' which has been irradiated with ultraviolet rays to undergo melt flow. As a result, a linear protrusion 66 having a width of 14 $\mu$m and a height of 1.5 $\mu$m is formed. At the same time, the unexposed dotted pattern 61 is allowed to reflow. As a result, a pillar spacer 68 having a height of 4.0 $\mu$m is formed. When the aforementioned steps are completed, an opposite substrate 4 is formed. Thereafter, a TFT substrate 2 having TFT, a pixel electrode 16, etc. formed on a glass substrate 10 and the opposite substrate 4 are laminated on each other with a liquid crystal 6 sealed interposed between the substrates 2 and 4 to complete a liquid crystal display device.

The linear protrusion 66 formed on the opposite substrate 4 according to the present embodiment of implementation of the invention exhibits a deteriorated uniformity in line width as compared with the linear protrusion formed by an ordinary photolithographic process but has little effect on the panel quality. In accordance with the present embodiment of implementation of the invention, the addition of a step of selectively irradiating the linear pattern 62 with ultraviolet rays makes it possible to form a linear protrusion 66 for controlling alignment and a pillar spacer 68 having a height different from that of the linear protrusion 66 at one photolithographic step. Accordingly, the present embodiment of implementation of the invention makes it possible to obtain a liquid crystal display device having good display properties while simplifying the production process to reduce the production cost.

[Third Embodiment of Implementation of the Invention]

Figure 8:
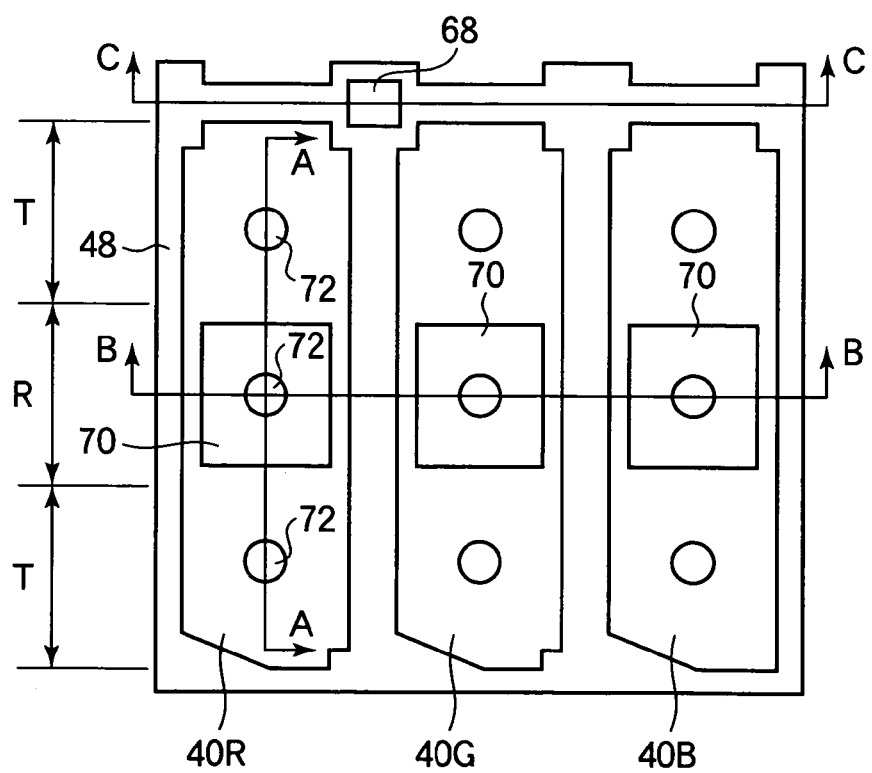
FIG. 8 is a diagram illustrating the configuration of a substrate for liquid crystal display device prepared by a method of manufacturing substrate for liquid crystal display device according to the third embodiment of implementation of the invention.
Figure 9:
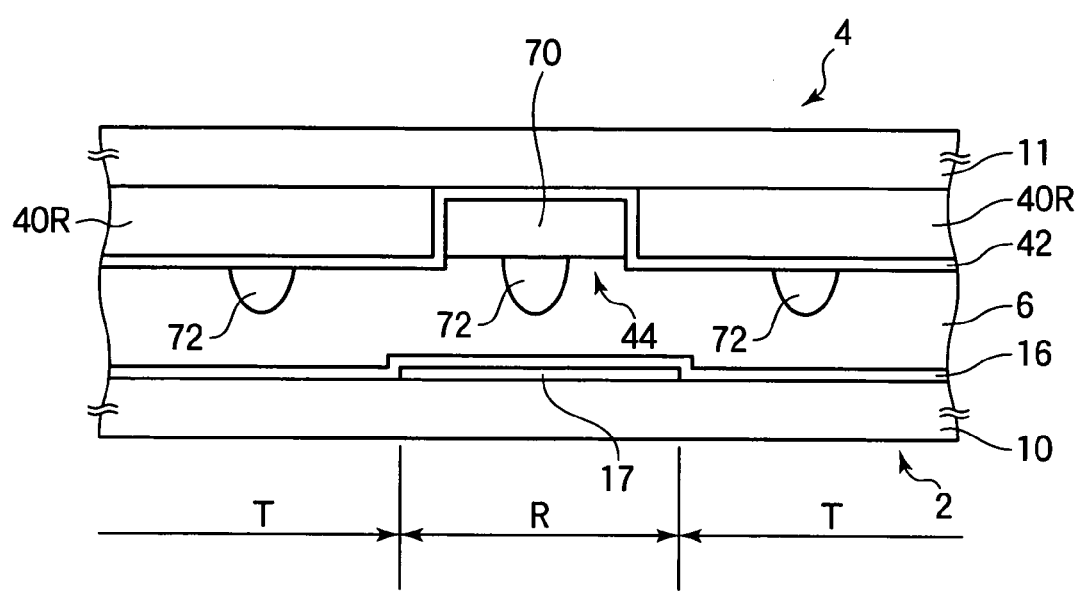
FIG. 9 is a diagram illustrating the sectional configuration of a liquid crystal display device prepared by a method of manufacturing a liquid crystal display device according to the third embodiment of implementation of the invention.

A method of manufacturing a substrate for liquid crystal display device according to the third embodiment of implementation of the invention and a method of manufacturing a liquid crystal display device using same will be described hereinafter in connection with FIGS. 8 to 14. FIG. 8 illustrates the configuration of three pixels in the opposite substrate 4 of a transreflective liquid crystal display device prepared according to the present embodiment of implementation of the invention. FIG. 9 illustrates a sectional configuration of the liquid crystal display device of FIG. 8 taken on line A—A. As shown in FIGS. 8 and 9, the pixel regions in the transreflective liquid crystal display device each are positioned at the central part of the pixel and comprise a reflective region R having a reflective electrode 17 formed on the TFT substrate 2 side thereof for reflecting external light and two light-transmitting regions T disposed at upper and lower positions as viewed on FIG. 8 with the reflective region R disposed interposed therebetween for passing light from backlight. CF layers 40R, 40G and 40B are formed on the entire area of the light-transmitting region T and a part of the reflective region R. Among the reflective region R, on a common electrode 42 on an opening 44 where CF layers 40R, 40G and 40B are not formed is formed a transparent dielectric layer 70. On the dielectric layer 70 on substantially central part of the reflective region R and the common electrode 42 on substantially central part of the two light-transmitting regions T is formed a dotted protrusion 72 for controlling the alignment of the liquid crystal 6. On the region shielded by BM48 is formed one pillar spacer 68 for maintaining the desired cell thickness per several to scores of pixels. The pillar spacer 68 comprises the CF layers 40R, 40G and 40B, the common electrode 42, a dielectric layer made of the same forming material as that of the dielectric layer 70 and a dielectric layer made of the same forming material as that of the dotted protrusion 72 laminated on each other.

This transreflective liquid crystal display device is arranged to mix light transmitted by the CF layers 40R, 40G and 40B with light transmitted by the opening 44, making it possible to inhibit the drop of reflectance during display in reflection mode. Further, the formation of the dielectric layer 70 on the common electrode 42 on the opening 44 makes it possible to approximate y characteristic of both the light transmission mode and reflection mode by each other and hence realize a liquid crystal display device having a reduced difference in display quality between the two modes.

FIGS. 10 to 14 each are a sectional view illustrating a method of manufacturing a substrate for liquid crystal display device according to the present embodiment of implementation of the invention. FIGS. 10 to 14A each illustrate a section of the substrate of FIG. 8 taken on line B—B and FIG. 10B illustrates a section of the substrate of FIG. 8 taken on line C—C.

Figure 10A:
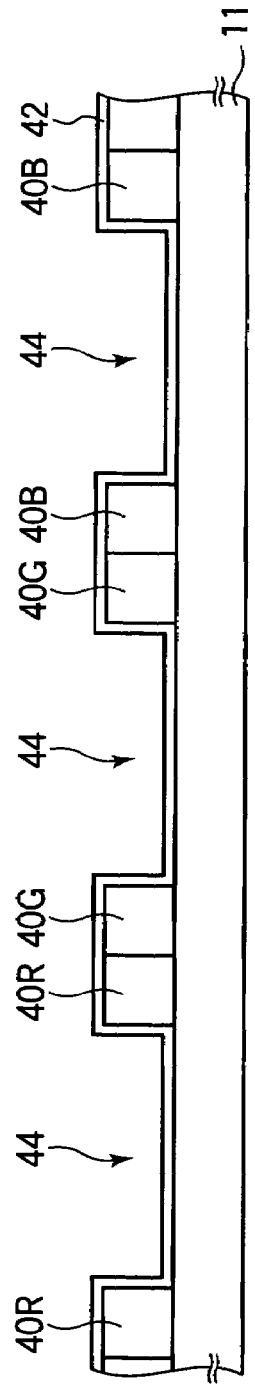
FIGS. 10A and 10B are sectional views illustrating a method of manufacturing a substrate for liquid crystal display device according to the third embodiment of implementation of the invention.
Figure 10B:
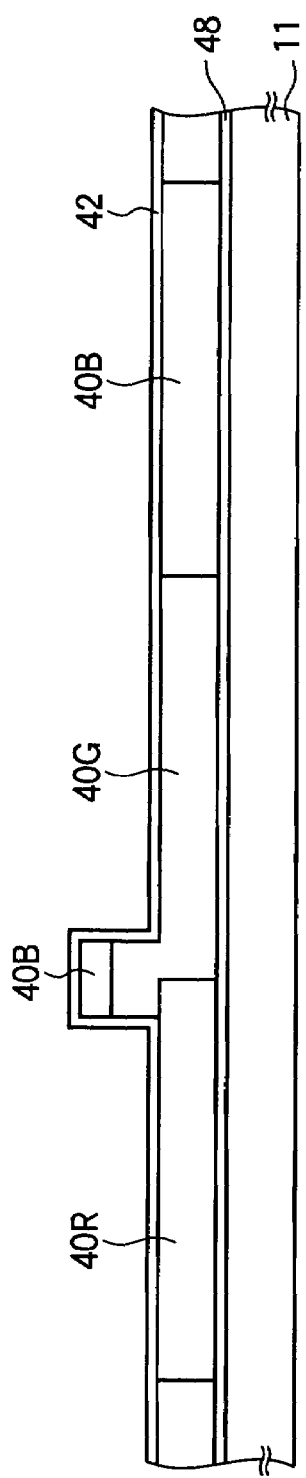

Firstly, as shown in FIGS. 10A and 10B, BM48 and the CF layers 40R, 40G and 40B are sequentially formed on the glass substrate 11. The three layers, i.e., CF layers 40R, 40G and 40B are laminated on the area for the formation of the pillar spacer 68. An opening (hole) 44 through which the CF layers 40R, 40G and 40B are partially opened is formed on a part of the reflective region R in the pixel region. Subsequently, the common electrode 42 is formed on the entire surface of the CF layers 40R, 40G and 40B.

Figure 11A:
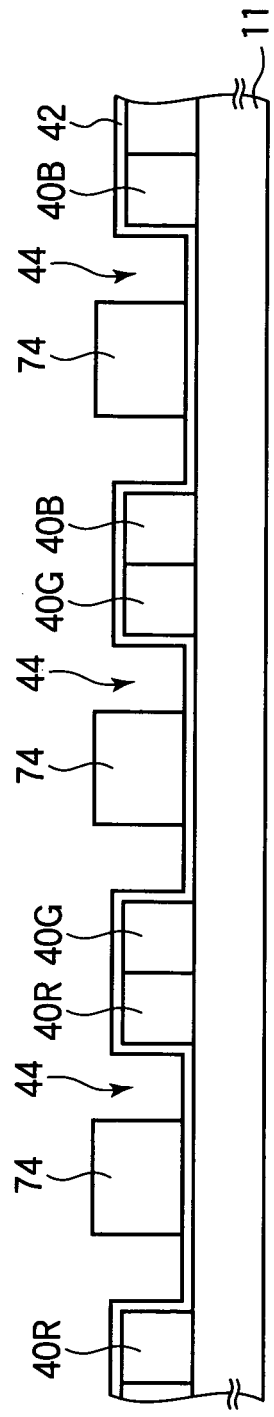
FIGS. 11A and 11B are sectional views illustrating a method of manufacturing a substrate for liquid crystal display device according to the third embodiment of implementation of the invention.
Figure 11B:
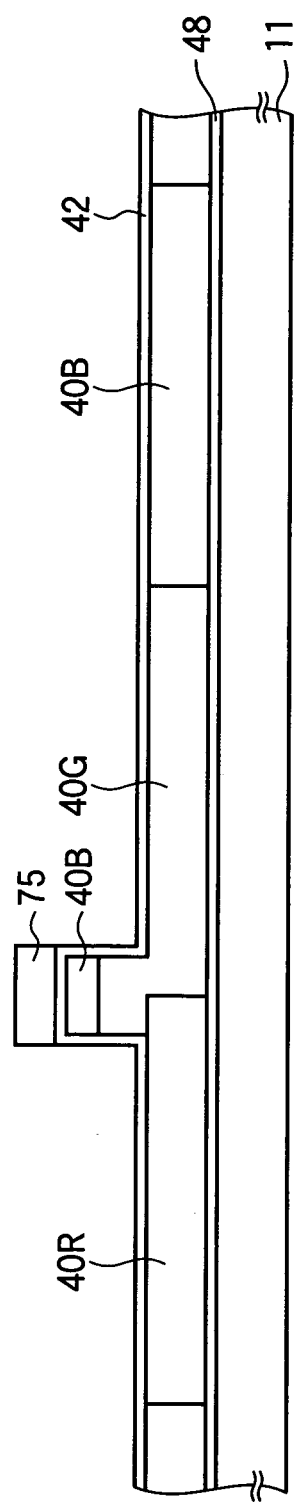

Subsequently, as shown in FIGS. 11A and 11B, a positive-working transparent acrylate resist (average molecular weight: 10,000 or more) is spread over the common electrode 42. The resist layer is then patterned to form dielectric layers 74 and 75. The dielectric layer 74 is formed on each of the openings 44. The dielectric layer 74 has a greater thickness than, e.g., the CF layers 40R, 40G and 40B and is formed on a narrower area than the opening 44. The dielectric layer 75 is formed laminated on the CF layers 40R, 40G and 40B, etc. on the area for the formation of the pillar spacer 68.

Subsequently, as shown in FIGS. 12A and 12B, the laminate is subjected to back surface exposure, i.e., irradiation with ultraviolet rays having a wavelength of, e.g., 365 nm (ultraviolet rays composed of light having a wavelength of 365 nm) on the back side of the glass substrate 11. This back surface exposure causes the dielectric layer 74 in the pixel region to be exposed. However, the dielectric layer 75 in the area for the formation of the pillar spacer 68 is not exposed because it is shielded from light by BM 48 and the CF layers 40R, 40G and 40B. This back surface exposure also causes the dielectric layer 74 in the pixel region to be bleached. Subsequently, the laminate is subjected to heat treatment (post-baking) in an oven having a temperature of from 150° C. to 250° C. (e.g., 220° C.) to calcine the dielectric layers 74 and 75. This heat treatment causes the dielectric layer 74 in the pixel region to undergo melt flow because it has been thoroughly exposed to light before post-baking. In this manner, a dielectric layer (structure) 70 which fills the opening 44 is self-aligningly formed as shown in FIG. 13A. On the other hand, the dielectric layer 75 in the area for the formation of the pillar spacer 68 undergoes reflow rather than melt flow because it has not been exposed to light as shown in FIG. 13B. Therefore, the dielectric layer 75 shows no drastic drop of thickness. The positive-working transparent acrylate resist which is a material for forming the dielectric layers 74 and 75 contains a heat-polymerizable material in an amount adjusted such that the dielectric layers undergo melt flow.

Figure 14A:
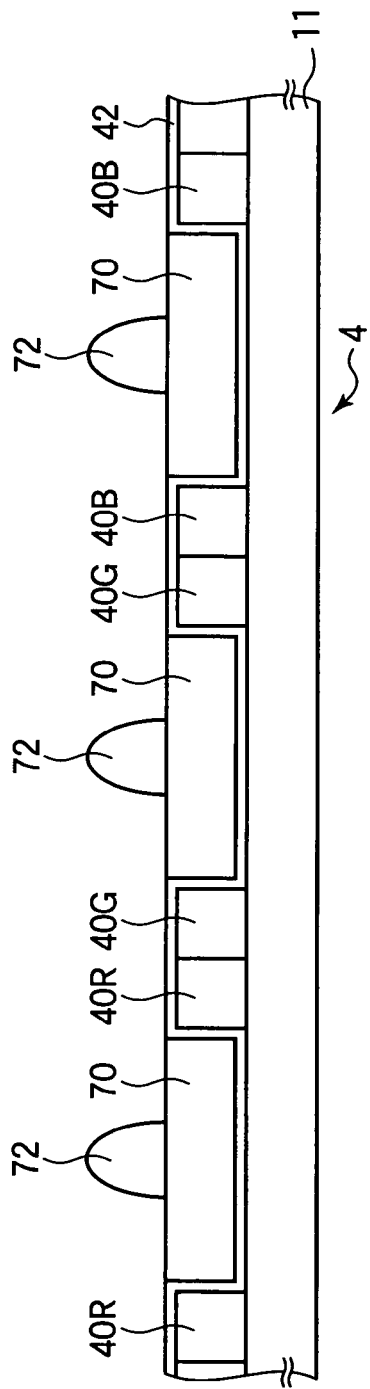
FIGS. 14A and 14B are sectional views illustrating a method of manufacturing a substrate for liquid crystal display device according to the third embodiment of implementation of the invention.
Figure 14B:
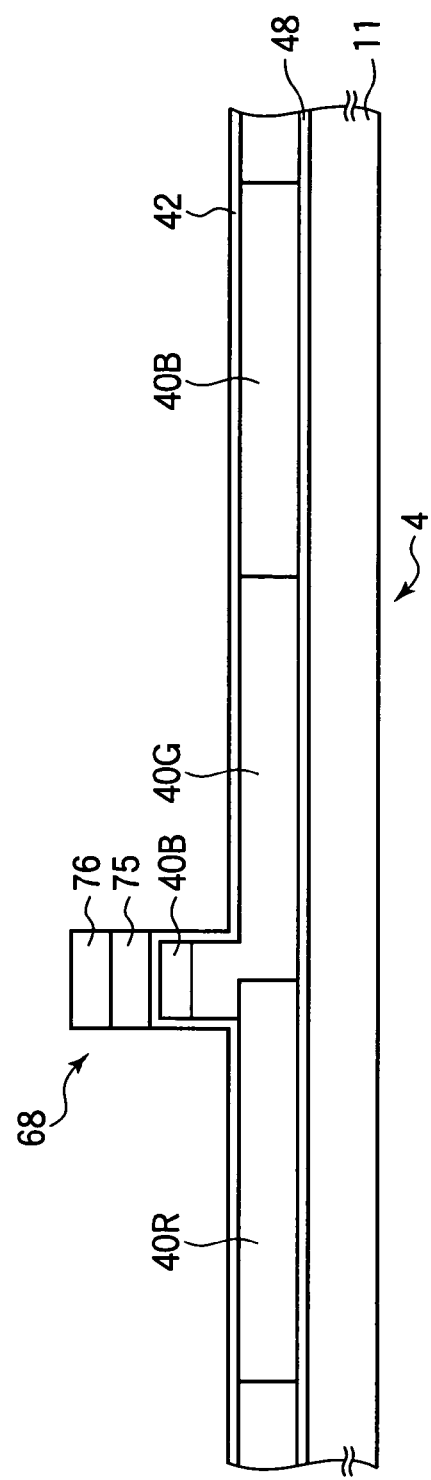

Subsequently, as shown in FIGS. 14A and 14B, a dotted protrusion 72 is formed on the dielectric layer 70 on substantially central part of the reflective region R and the common electrode 42 on substantially central part of the two light-transmitting regions T. At the same time, a dielectric layer 76 is formed on the area for formation of the pillar spacer 68. In this manner, the pillar spacer 68 formed by a laminate of the CF layers 40R, 40G and 40B, the common electrode 42 and the dielectric layers 75 and 76 is formed. When the aforementioned steps are completed, the opposite substrate 4 is formed. Thereafter, a TFT substrate 2 having TFT, a pixel electrode 16, etc. formed on a glass substrate 10 and the opposite substrate 4 are laminated on each other with a liquid crystal 6 sealed interposed between the substrates 2 and 4 to complete a liquid crystal display device.

The present embodiment of implementation of the invention involves the formation of the pillar spacer 68 by the lamination of the CF layers 40R, 40G and 40B, the common electrode 42 and the dielectric layers 75 and 76 and thus requires no separate step of forming the pillar spacer 68 and can provide a pillar spacer 68 having a thickness great enough to maintain the desired cell thickness. Further, the pillar spacer 68 comprises the common electrode 42 formed under the dielectric layers 75 and 76 and thus is arranged such that no short-circuiting occurs with respect to the TFT substrate 2. Moreover, since the dielectric layer 70 is formed so as to fill the opening 44 with its melt flow, there occurs no misalignment in overlapping between the dielectric layer 70 and the opening 44. Accordingly, the present embodiment of implementation of the invention can provide a liquid crystal display device having good display properties while simplifying the production step.

[Fourth Embodiment of Implementation of the Invention]

Figure 15:
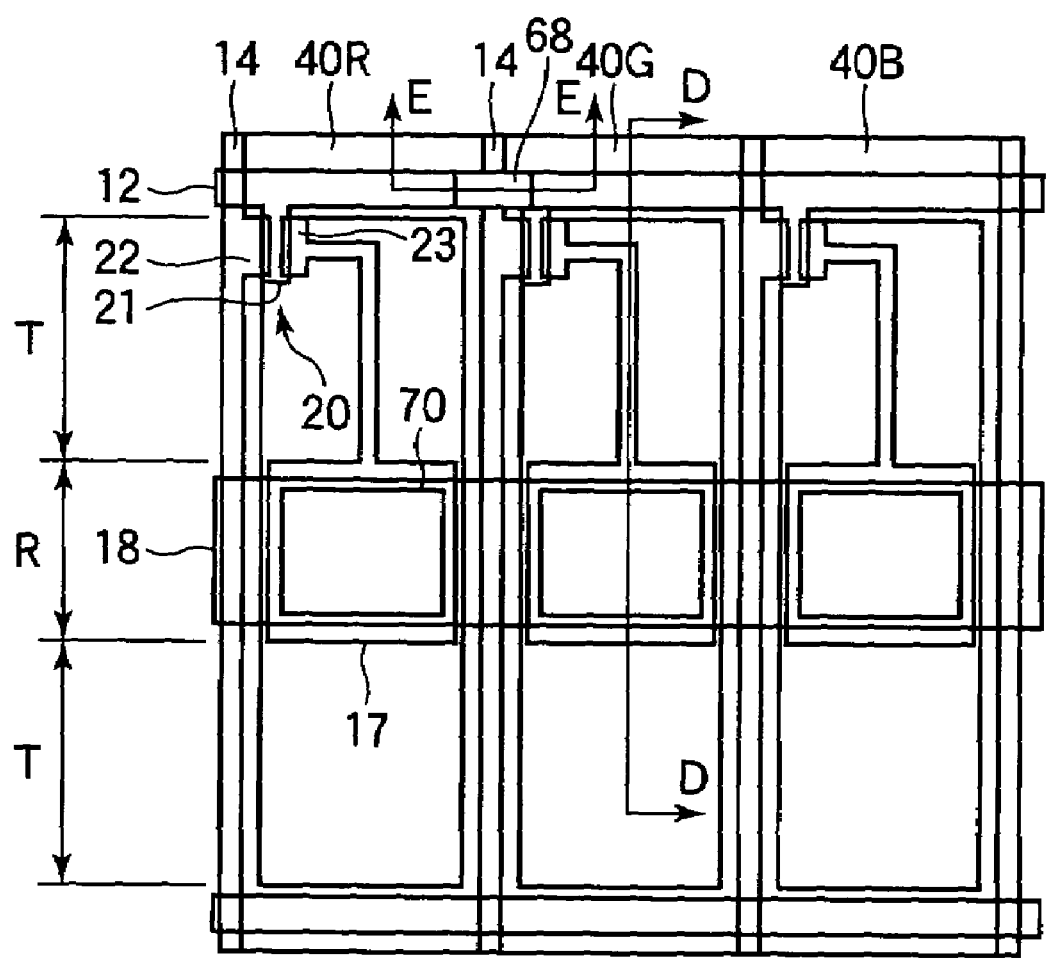
FIG. 15 is a diagram illustrating the configuration of a substrate for liquid crystal display device prepared by a method of manufacturing a substrate for liquid crystal display device according to the fourth embodiment of implementation of the invention.
Figure 16A:
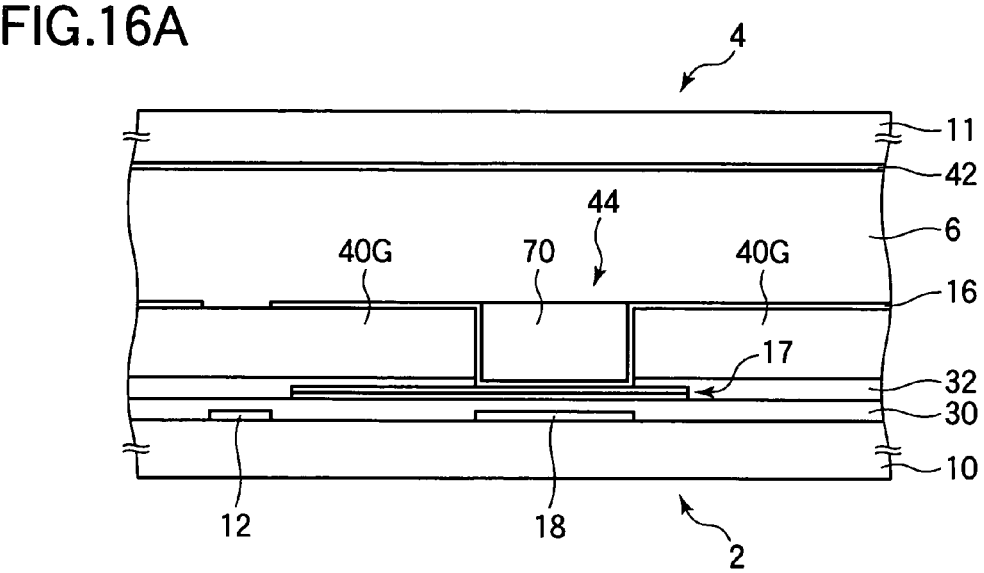
FIGS. 16A and 16B are diagrams illustrating the configuration of a liquid crystal display device prepared by a method of manufacturing a liquid crystal display device according to the fourth embodiment of implementation of the invention.
Figure 16B:
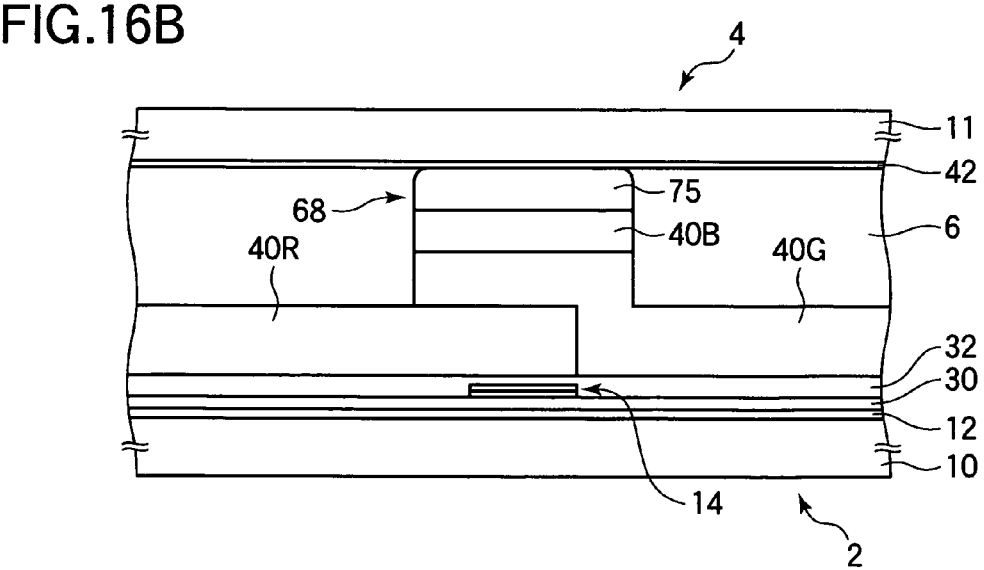

A method of manufacturing a substrate for liquid crystal display device according to the fourth embodiment of implementation of the invention and a method of manufacturing a liquid crystal display device using same will be described hereinafter in connection with FIGS. 15 to 19. FIG. 15 illustrates the configuration of the three pixels of TFT substrate 2 of a transreflective liquid crystal display device having a CF-on-TFT structure prepared according to the present embodiment of implementation of the invention. FIG. 16A illustrates the sectional configuration of the liquid crystal display device of FIG. 15 taken on line D—D and FIG. 16B illustrates the sectional configuration of the liquid crystal display device of FIG. 15 taken on line E—E. As shown in FIGS. 15, 16A and 16B, the glass substrate 10 comprises a plurality of gate bus lines 12 formed thereon extending in the crosswise direction as viewed on FIG. 15. A plurality of drain bus lines 14 are formed interposing an insulating layer 30, crossing the gate bus lines 12 and extending longitudinally as viewed on FIG. 15. A storage capacitor bus line 18 is formed across the pixel region defined by the gate bus line 12 and the drain bus line 14 extending in parallel to the gate bus line 12. In the vicinity of the point at which the gate bus line 12 and the drain bus line 14 cross each other is formed TFT 20. The gate electrode 21 of TFT 20 is electrically connected to the gate bus line 12. The source electrode 23 of TFT 20 is electrically connected to the reflective electrode 17 formed on the central part of the pixel region.

On the entire surface of the substrate on the drain bus line 14, the drain electrode 22, the source electrode 23 and the reflective electrode 17 is formed a protective layer 32 made of SiN layer or the like. On the protective layer 32 are formed CF layers 40R, 40G and 40B made of a pigment-dispersed negative-working resist every pixel. On at least a part of the reflective electrode 17 is formed an opening 44 through which the CF layers 40R, 40G and 40B and the protective layer 32 are exposed. On the CF layers 40R, 40G and 40B is formed a transparent pixel electrode 16. The pixel electrode 16 is electrically connected to the reflective electrode 17 via the opening 44. The pixel region comprises a reflective region R having a reflective electrode 17 formed thereon and a light-transmitting region T having a pixel electrode 16 formed thereon rather than reflective electrode 17. Outside the pixel region is formed a pillar spacer 68 for maintaining the desired cell thickness. The pillar spacer 68 comprises the CF layers 40R, 40G and 40B, the dielectric layer 75, etc. laminated on each other. On the other hand, on the entire surface of the glass substrate 11 on the opposite substrate 4 side thereof is formed a common electrode 42.

Figure 17A:
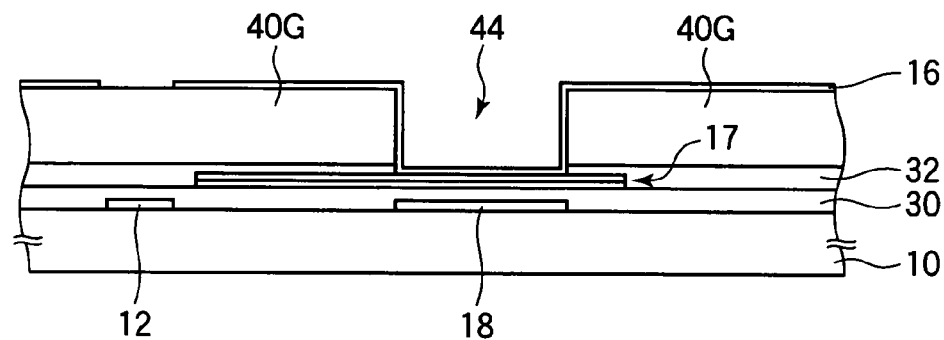
FIGS. 17A and 17B are sectional views illustrating a method of manufacturing a substrate for liquid crystal display device according to the fourth embodiment of implementation of the invention.
Figure 17B:
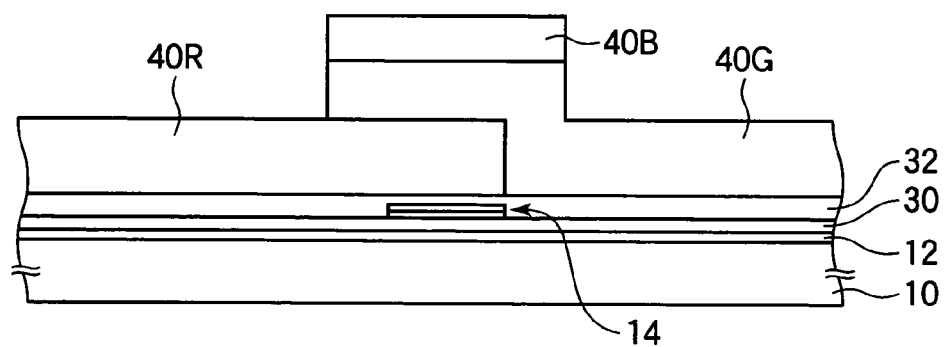
Figure 18A:
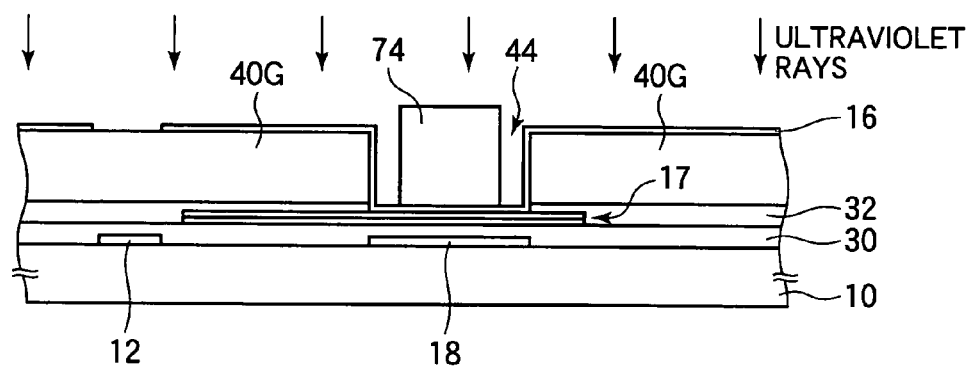
FIGS. 18A and 18B are sectional views illustrating a method of manufacturing a substrate for liquid crystal display device according to the fourth embodiment of implementation of the invention.
Figure 18B:
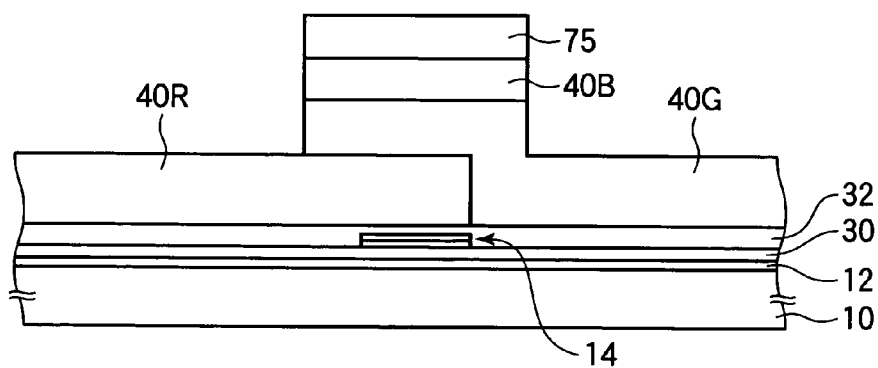
Figure 19A:
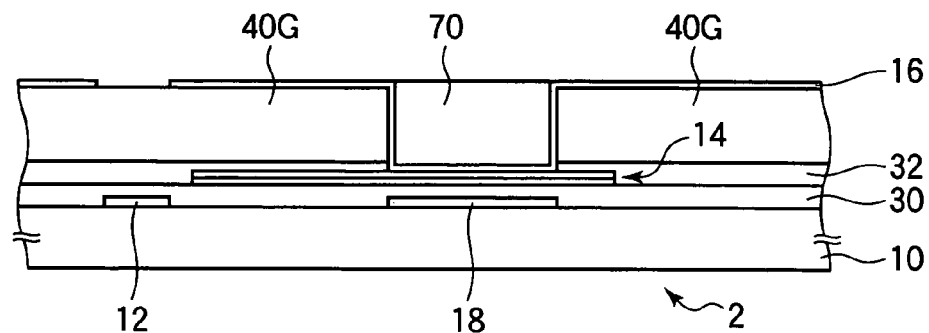
FIGS. 19A and 19B are sectional views illustrating a method of manufacturing a substrate for liquid crystal display device according to the fourth embodiment of implementation of the invention.
Figure 19B:
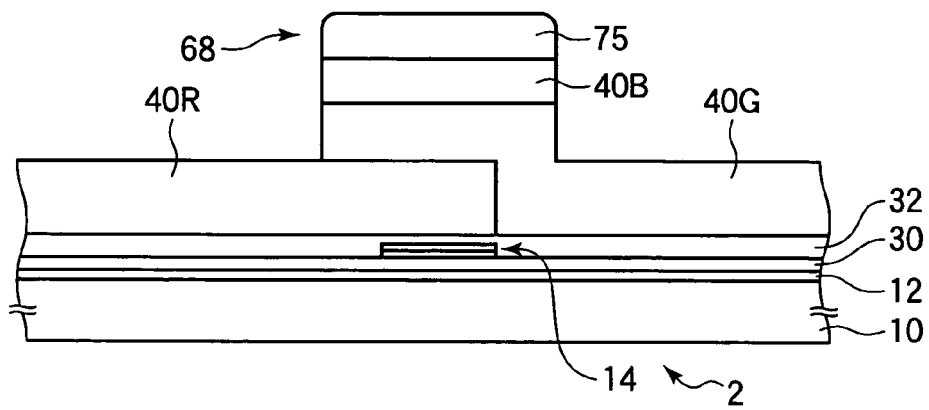

FIGS. 17 to 19 each are a sectional view illustrating a method of manufacturing a substrate for liquid crystal display device according to the present embodiment of implementation of the invention. FIGS. 17A, 18A and 19A each illustrate a section corresponding to FIGS. 16A and FIG. 17B, 18B and 19B each illustrate a section corresponding to FIG. 16B.

As shown in FIGS. 17A and 17B, on the glass substrate 10 are formed the gate bus line 12 and the storage capacitor bus line 18 (and the gate electrode 21 of TFT 20). Subsequently, the insulating layer 30 is formed on the entire surface of the substrate on the gate bus line 12 and the storage capacitor bus line 18. Subsequently, on the insulating layer 30 are formed the operation semiconductor layer of TFT 20 or channel protective layer (both not shown). Subsequently, the drain bus line 14, the reflective electrode 17 (and the drain electrode 22 and source electrode 23 of TFT 20) are formed. Subsequently, the protective layer 32 is formed on the entire surface of the substrate on the drain bus line 14 and the reflective electrode 17. Subsequently, the protective layer 32 is patterned so that at least part of the reflective region R is opened to form an opening 44. Subsequently, the CF layers 40R, 40G and 40B are sequentially formed on the entire surface of the protective layer 32. The opening (hole) 44 through which the CF layers 40R, 40G and 40B are exposed is formed on at least a part of the reflective region R. In the opening 44, the surface of the reflective electrode 17 is exposed because the protective layer 32 has been removed. The opening 44 is formed in a predetermined size such that tint and transmittance during reflective display are properly adjusted. On the area for the formation of the pillar spacer 68, the three layers, i.e., CF layers 40R, 40G and 40B are laminated on each other. Subsequently, the pixel electrode 16 made of ITO is formed on the entire surface of the CF layers 40R, 40G and 40B every pixel. The pixel electrode 16 is electrically connected to the reflective electrode 17 via the opening 44.

Subsequently, as shown in FIGS. 18A and 18B, a positive-working transparent acrylate resist (average molecular weight: 10,000 or more) is spread over the entire surface of the substrate on the pixel electrode 16. The resist layer is then patterned to form the dielectric layers 74 and 75. The dielectric layer 74 is formed on the various openings 44. The dielectric layer 74 has a greater thickness than, e.g., the CF layers 40R, 40G and 40B and is formed on a narrower area than the opening 44. The dielectric layer 75 is formed laminated on the CF layers 40R, 40G and 40B, etc. on the area for the formation of the pillar spacer 68. Subsequently, the dielectric layer 74 is irradiated with ultraviolet rays (wavelength: 300 nm to 450 nm) through a photomask (not shown) for shielding the dielectric layer 75 on the area for the formation of the pillar spacer 68. Subsequently, the laminate is subjected to heat treatment (post-baking) in an oven having a temperature of from 150° C. to 250° C. (e.g., 220° C.) to calcine the dielectric layers 74 and 75. This heat treatment causes the dielectric layer 74 to undergo melt flow because it has been thoroughly expressed to light before post-baking. In this manner, a dielectric layer (structure) 70 which fills the opening 44 is self-aligningly formed as shown in FIG. 19A. On the other hand, as shown in FIG. 19B, the dielectric layer 75 in the area for the formation of the pillar spacer 68 undergoes reflow rather than melt flow because it has not been exposed to light. Therefore, the dielectric layer 75 shows no drastic drop of thickness. In this manner, a pillar spacer 68 comprising a laminate of the CF layers 40R, 40G and 40B, the dielectric layer 75, etc. is formed. The positive-working transparent acrylate resist which is a material for forming the dielectric layers 74 and 75 contains a heat-polymerizable material in an amount adjusted such that the dielectric layers undergo melt flow. When the aforementioned steps are completed, a TFT substrate 2 is formed. Thereafter, an alignment layer is printed on the surface of TFT substrate 2 and the opposite substrate 4. The substrates 2 and 4 are laminated on each other with a liquid crystal 6 sealed interposed therebetween to complete a liquid crystal display device.

The present embodiment of implementation of the invention involves the formation of the pillar spacer 68 by the lamination of the CF layers 40R, 40G and 40B, the dielectric layer 75, etc. and thus requires no separate step of forming the pillar spacer 68 and can provide a pillar spacer 68 having a height great enough to maintain the desired cell thickness. Further, since the dielectric layer 70 is formed so as to fill the opening 44 with its melt flow, there occurs no misalignment in overlapping between the dielectric layer 70 and the opening 44. Accordingly, the present embodiment of implementation of the invention can provide a liquid crystal display device having good display properties while simplifying the production step.

[Fifth Embodiment of Implementation of the Invention]

Figure 20:
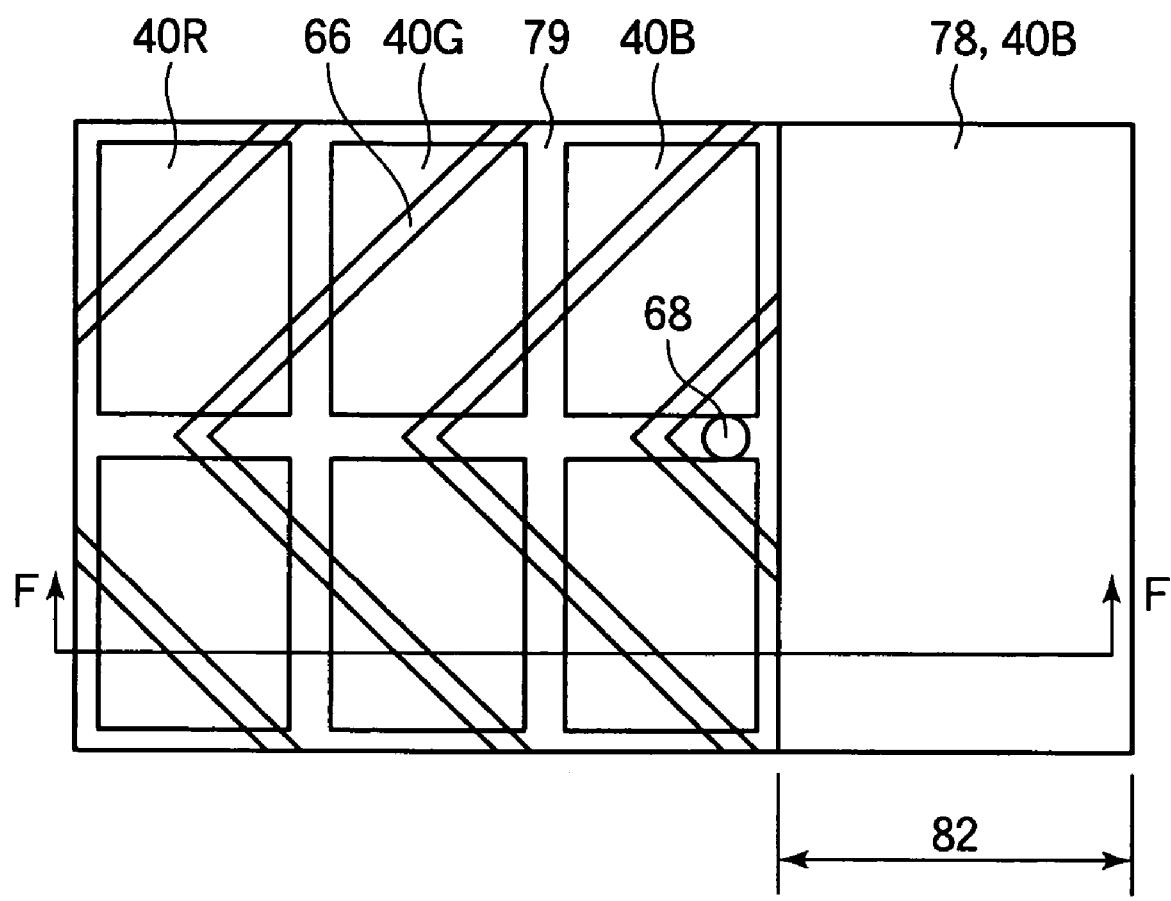
FIG. 20 is a diagram illustrating the configuration of a substrate for liquid crystal display device prepared by a method of manufacturing a substrate for liquid crystal display device according to the fifth embodiment of implementation of the invention.
Figure 21:
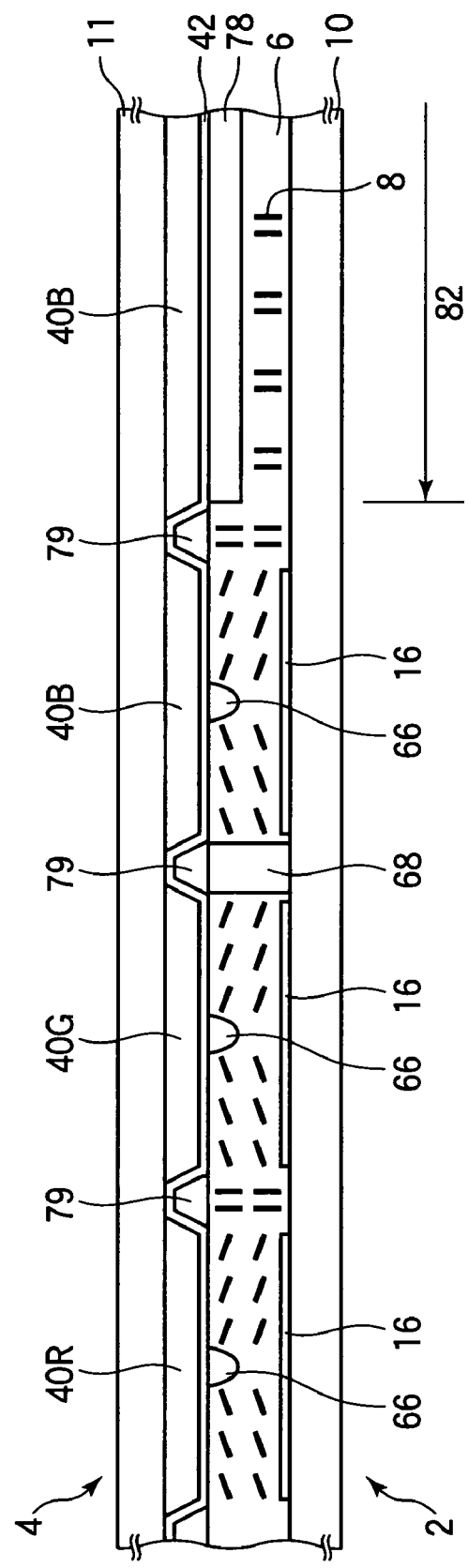
FIG. 21 is a diagram illustrating the configuration of a liquid crystal display device prepared by a method of manufacturing a liquid crystal display device according to the fifth embodiment of implementation of the invention.

A method of manufacturing a substrate for liquid crystal display device according to the fifth embodiment of implementation of the invention and a method of manufacturing a liquid crystal display device using same will be described hereinafter in connection with FIGS. 20 to 24. FIG. 20 illustrates the configuration of the three pixels and frame region on CF substrate 4 of the liquid crystal display device prepared according to the present embodiment of implementation of the invention. FIG. 21 illustrates the sectional configuration of the liquid crystal display device of FIG. 20 taken on line F—F. For ease of understanding, FIG. 21 and FIG. 23C shown below each illustrates the sectional configuration of the liquid crystal display device with the pillar spacer 68 shown disposed on the line F—F.

As shown in FIGS. 20 and 21, the CF layer 40B and the dielectric layer 78 are formed in the frame region 82 of the opposite substrate 4. The dielectric layer 79 which acts as BM is formed interposed between the-adjacent pixel regions. The dielectric layers 78 and 79 are formed on the common electrode 42 and thus are capable of lowering the effective voltage applied to the liquid crystal 6. In this arrangement, a normally-black mode liquid crystal display device can be provided with sufficient light-shielding properties even if the simple body of the dielectric layers 78 and 79 has a high transmittance.

Figure 22A:
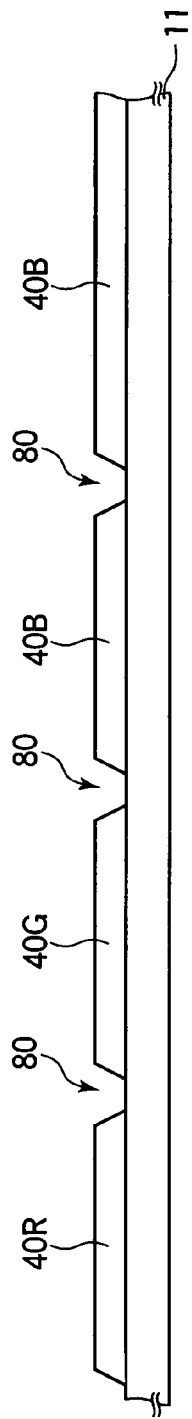
FIGS. 22A, 22B and 22C are sectional views illustrating a method of manufacturing a substrate for liquid crystal display device according to the fifth embodiment of implementation of the invention.

FIGS. 22 to 24 each are a sectional view illustrating the method of manufacturing a substrate for liquid crystal display device according to the present embodiment of implementation of the invention. Firstly, as shown in FIG. 22A, the CF layers 40B, 40R and 40G are sequentially formed on the entire surface of a glass substrate 11. The present embodiment of implementation of the invention involves the formation of CF layers before the formation of BM and thus requires that an alignment mark be formed on the first CF layer. Therefore, a CF layer 40B having a low transmittance is formed as a first CF layer. The CF layer 40B is also formed on the frame region 82 around the display region. A gap (groove) 80 having a predetermined width is formed interposed between the adjacent CF layers 40R, 40G and 40B.

Figure 22B:
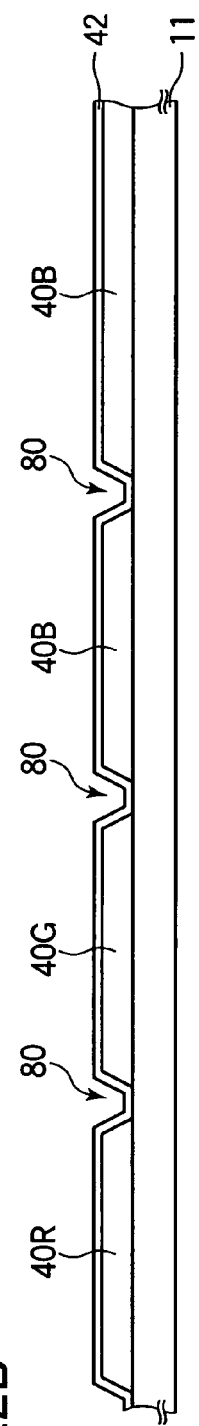
Figure 22C:
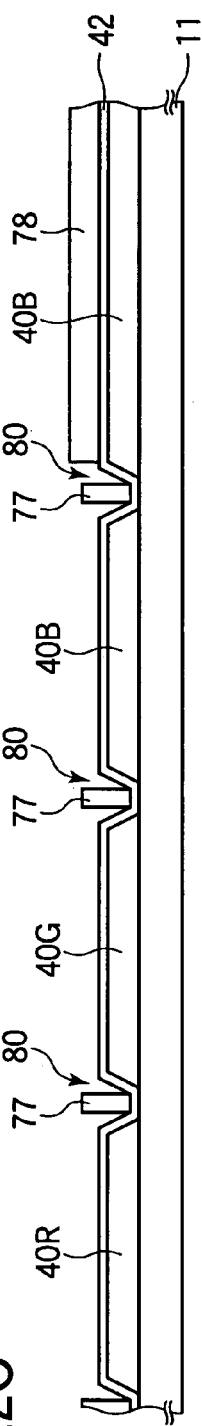

Subsequently, as shown in FIG. 22B, a common electrode 42 made of ITO or the like is formed on the entire surface of the substrate on the CF layers 40R, 40G and 40B. Subsequently, as shown in FIG. 22C, a positive-working novolak-based resist (average molecular weight: 10,000 or more) or the like is spread over the entire surface of the common electrode 42. The resin layer is then patterned to form the dielectric layers 77 and 78. The dielectric layer 77 is formed in the gap 80 and the dielectric layer 78 is formed on the frame region 82. The dielectric layer 77 has a greater thickness than, e.g., the CF layers 40R, 40G and 40B and a narrower width than the gap 80.

Figure 23A:
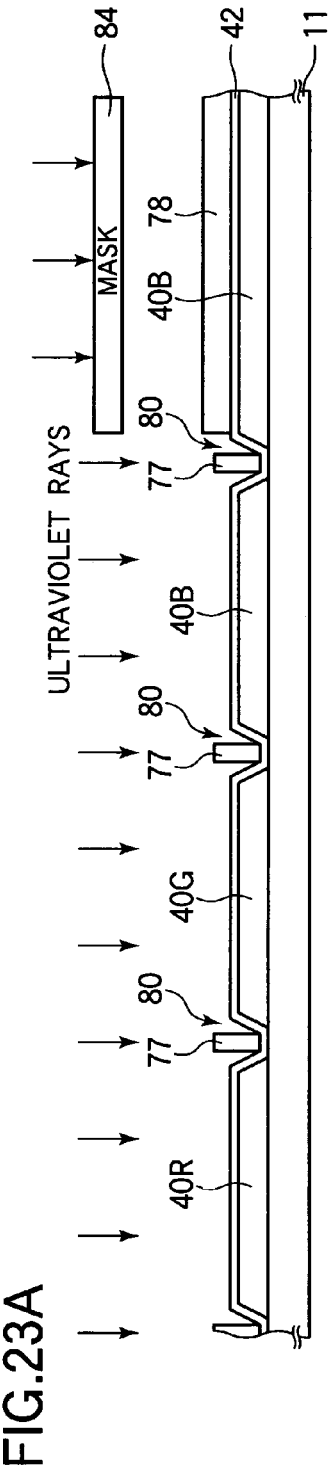
FIGS. 23A, 23B and 23C are sectional views illustrating a method of manufacturing a substrate for liquid crystal display device according to the fifth embodiment of implementation of the invention.
Figure 23B:
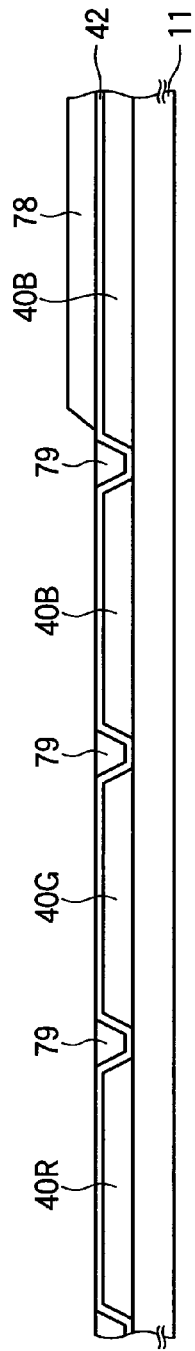
Figure 23C:
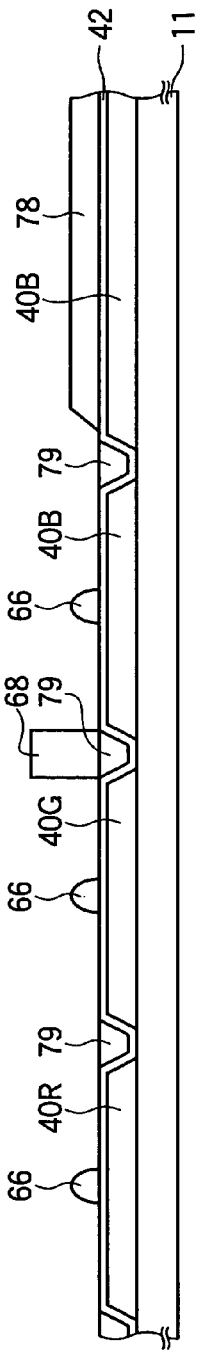
Figure 27A:
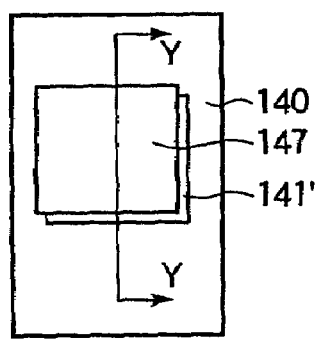
FIGS. 27A and 27B are diagrams illustrating the configuration of opposite substrates having a misalignment in overlapping.
Figure 27B:
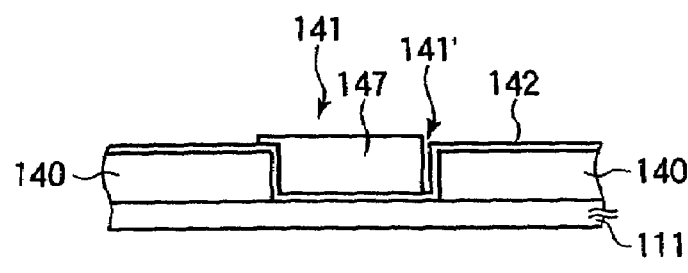
Figure 28:
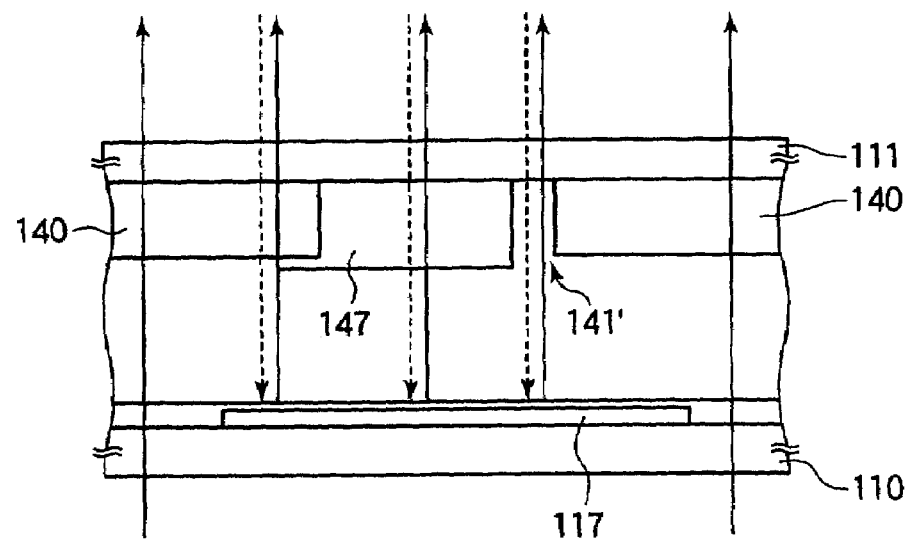
FIG. 28 is a sectional view illustrating the configuration of a transreflective liquid crystal display device having a misalignment in overlapping.

Subsequently, as shown in FIG. 23A, the dielectric layer 77 is irradiated with ultraviolet rays (wavelength: 300 nm to 450 nm) through a photomask 84 for shielding the dielectric layer 78 of the frame region 82 from light. Subsequently, the laminate is subjected to heat treatment (post-baking) in an oven having a temperature of from 150° C. to 250° C. (e.g., 220° C.) to calcine the dielectric layer 77. This heat treatment causes the dielectric layer 77 to undergo melt flow because it has been thoroughly exposed to light before post-baking. In this manner, a dielectric layer (structure) 79 which fills the gap 80 is self-aligningly formed as shown in FIG. 23B. On the other hand, the dielectric layer 78 in the frame region 82 does not undergo melt flow because it has not been exposed to light. The dielectric layer 79 does not sufficiently act as BM when it is in the form of simple body because it has a high transmittance. However, since the dielectric layer 79 has an effect of lowering the effective voltage applied to the liquid crystal 6, the resulting normally-black mode liquid crystal display device can be provided with sufficient light-shielding properties. Further, the frame region 82 can be provided with sufficient light-shielding properties because it comprises a laminate of the CF layer 40B having a relatively low transmittance and the dielectric layer 78 capable of lowering the effective voltage applied to the liquid crystal 6. Subsequently, as shown in FIG. 23C, a linear protrusion 66 and a pillar spacer 68 are sequentially formed. When the aforementioned steps are completed, the opposite substrate 4 is completed. Thereafter, an alignment layer is printed on the surface of TFT substrate 2 and the opposite substrate 4. The substrates 2 and 4 are then laminated on each other with a liquid crystal 6 sealed interposed therebetween to complete the liquid crystal display device.

While the present embodiment of implementation of the invention has been described with reference to the case where the dielectric layers 78 and 79 made of a positive-working novolak-based resist each act as BM, the dielectric layers 78 and 79 may be formed by a positive-working resist comprising a black pigment dispersed therein. In this arrangement, a normally-white mode liquid crystal display device, too, can be provided with sufficient light-shielding properties.

In the present embodiment of implementation of the invention, the dielectric layer 79 which acts as BM is formed so as to fill the gap 80 with its melt flow, making it possible to prevent the occurrence of misalignment in overlapping between the dielectric layer 79 and the gap 80. Accordingly, the present embodiment of implementation of the invention can provide a liquid crystal display device having good display properties while simplifying the production process.

FIG. 24 illustrates a modification of the method of manufacturing a substrate for liquid crystal display device according to the present embodiment of implementation of the invention. As shown in FIG. 24, a dielectric layer 66' which acts as a linear protrusion 66 is formed at the same time at the step of patterning the dielectric layers 77 and 78. At the step of irradiating the laminate with ultraviolet rays, the dielectric layer 77 is irradiated with ultraviolet rays through a photomask 85 for shielding the dielectric layer 66' from light in addition to the dielectric layer 78 in the frame region 82. At the heat treatment step, the dielectric layer 66' does not undergo melt flow because it has not been exposed to light. As a result, the linear protrusion 66 having a predetermined thickness is formed. In accordance with the present modification, the step of forming the linear protrusion 66 can be eliminated, making it possible to further simplify the method of manufacturing liquid crystal display device.

While the invention has been described in detail and with reference to specific embodiments thereof, it will be apparent to one skilled in the art that various changes and modifications can be made therein without departing from the spirit and scope thereof.

For example, while the aforementioned embodiments have been described with reference to MVA type liquid crystal display devices and transreflective liquid crystal display devices, the present invention is not limited thereto but may be applied to other types of liquid crystal display devices.

What is claimed is:

1. A method of manufacturing a substrate for liquid crystal display device, comprising the steps of:

forming a resist layer by spreading a positive-working resist on a base substrate;

forming a resist pattern having a predetermined shape by exposing and developing the resist layer;

irradiating a part of the resist pattern with ultraviolet rays, wherein the ultraviolet rays do not cause a crosslinking reaction in the part of the resist pattern; and forming a structure by heat treatment to the resist pattern at a predetermined temperature so that the resist pattern which has been irradiated with ultraviolet rays undergoes melt flow.

2. A method of manufacturing a substrate for liquid crystal display device as defined in claim 1, wherein a wavelength of the ultraviolet rays is not less than 300 nm and not more than 450 nm.

3. A method of manufacturing a substrate for liquid crystal display device as defined in claim 1, wherein the predetermined temperature is 150° C. or more.

4. A method of manufacturing a substrate for liquid crystal display device as defined in claim 1, wherein the predetermined temperature is 250° C. or less.

5. A method of manufacturing a substrate for liquid crystal display device as defined in claim 1, wherein the irradiating step involves the use of rear surface exposure.

6. A method of manufacturing a substrate for liquid crystal display device as defined in claim 1, wherein the irradiating step involves the use of a photomask for light-shielding the other area of the resist pattern.

7. A method of manufacturing a substrate for liquid crystal display device as defined in claim 1, wherein the part of the resist pattern is formed in hole or groove portions on the base substrate and the structure is formed in such an arrangement that it fills the hole or groove portions.

8. A method of manufacturing a substrate for liquid crystal display device as defined in claim 7, wherein the groove portions contain a gap formed between adjacent color filter layers.

9. A method of manufacturing a substrate for liquid crystal display device as defined in claim 7, wherein the hole portions contain an opening formed in a color filter layer.

10. A method of manufacturing a substrate for liquid crystal display device as defined in claim 1, wherein the resist pattern which has been irradiated with ultraviolet rays is allowed to undergo melt flow while the resist pattern which has not been irradiated with ultraviolet rays is allowed to reflow to form structures having different heights in one lot.

11. A method of manufacturing a liquid crystal display device comprising the steps of:

preparing a pair of substrates; and laminating the substrates on each other with a liquid crystal sealed interposed therebetween, wherein at least one of the substrates is prepared by a method of manufacturing a substrate for liquid crystal display device as defined in claim 1.

* * * * *